US009821251B2

(12) United States Patent
Tanizaki et al.

(10) Patent No.: US 9,821,251 B2
(45) Date of Patent: Nov. 21, 2017

(54) EXTERNAL-PERFUSION HOLLOW-FIBER MEMBRADE MODULE AND INKJET PRINTER HAVING SAID MODULE

(71) Applicant: MITSUBISHI RAYON CO., LTD., Chiyoda-ku (JP)

(72) Inventors: Yoshie Tanizaki, Toyohashi (JP); Hiroyuki Okazaki, Toyohashi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 14/906,726

(22) PCT Filed: Jul. 23, 2014

(86) PCT No.: PCT/JP2014/069396
§ 371 (c)(1),
(2) Date: Jan. 21, 2016

(87) PCT Pub. No.: WO2015/012293
PCT Pub. Date: Jan. 29, 2015

(65) Prior Publication Data
US 2016/0158670 A1    Jun. 9, 2016

(30) Foreign Application Priority Data

Jul. 24, 2013 (JP) ................................ 2013-153865
Jul. 24, 2013 (JP) ................................ 2013-153866

(51) Int. Cl.
*B41J 2/19* (2006.01)
*B41J 2/175* (2006.01)
(Continued)

(52) U.S. Cl.
CPC ......... *B01D 19/0031* (2013.01); *B01D 63/02* (2013.01); *B01D 63/024* (2013.01);
(Continued)

(58) Field of Classification Search
CPC ................................ B41J 2/19; B41J 2/17563
See application file for complete search history.

(56) References Cited

U.S. PATENT DOCUMENTS 6,402,818 B1 *  6/2002  Sengupta ........... B01D 19/0031
                                                                95/46
6,447,679 B1 *  9/2002  Watari ............... B01D 19/0031
                                                               210/490

FOREIGN PATENT DOCUMENTS

CN        1780675 A      5/2006
CN      102046271 A      5/2011
(Continued)

OTHER PUBLICATIONS

International Search Report issued Oct. 28, 2014 in PCT/JP14/69396 filed Jul. 23, 2014.
(Continued)

*Primary Examiner* — Jason Uhlenhake
(74) *Attorney, Agent, or Firm* — Oblon, McClelland, Maier & Neustadt, L.L.P.

(57) ABSTRACT

The present invention relates to a external-perfusion hollow-fiber membrane module containing a hollow-fiber membrane bundle including a plurality of hollow-fiber membranes; and a casing that houses the hollow-fiber membrane bundle, wherein the hollow-fiber membrane bundle has one end that is fixed to an inside of the casing by a potting portion in an open state, and the external-perfusion hollow-fiber membrane module is configured to perform degassing on a gas contained in a liquid inside the casing, the gas being introduced into an inside from an outer surface of the hollow-fiber membrane.

21 Claims, 15 Drawing Sheets

(51) Int. Cl.
*B01D 19/00* (2006.01)
*B01D 63/02* (2006.01)
*B01D 63/04* (2006.01)

(52) U.S. Cl.
CPC .......... *B01D 63/04* (2013.01); *B41J 2/17563* (2013.01); *B41J 2/19* (2013.01); *B01D 2313/00* (2013.01); *B01D 2313/08* (2013.01); *B01D 2313/10* (2013.01)

(56) References Cited

FOREIGN PATENT DOCUMENTS

| CN | 103153427 A | 6/2013 |
| EP | 1 160 002 A2 | 12/2001 |
| JP | 49-44851 | 4/1974 |
| JP | H06327905 | 11/1994 |
| JP | 2000-233118 | 8/2000 |
| JP | 2000233118 a2 * | 8/2000 |
| JP | 2008-30023 A | 2/2008 |
| JP | 2009-202112 | 9/2009 |
| JP | 2011-189261 | 9/2011 |
| JP | 2011189261 a2 * | 9/2011 |
| JP | 2012-161793 A | 8/2012 |
| WO | WO 2008/088293 A1 | 7/2008 |

OTHER PUBLICATIONS

Extended European Search Report issued Jun. 24, 2016 in Patent Application No. 14829502.5.

Office Action dated Mar. 31, 2017 in corresponding Korean Patent Application No. 10-2016-7001924, with machine translation, 18 pages.

Chinese Office Action dated Sep. 13, 2016 in corr. Chinese Patent Application No. 201480046511.5, filed Jul. 23, 2014 (w/ machine-generated English translation).

* cited by examiner

EXTERNAL-PERFUSION HOLLOW-FIBER MEMBRADE MODULE AND INKJET PRINTER HAVING SAID MODULE

TECHNICAL FIELD

The present invention relates to an external-perfusion hollow-fiber membrane module and an inkjet printer having the module.

This application is based upon and claims the benefit of priority of the prior Japanese Patent application No. 2013-153865 which has been filed in Japan on Jul. 24, 2013, and the prior Japanese Patent application No. 2013-153866 which has been filed in Japan on Jul. 24, 2013, the entire contents of which are incorporated herein by reference.

BACKGROUND ART

A module using a hollow-fiber membrane (hereinafter, referred to as a hollow-fiber membrane module) has been known from the past. Examples of the hollow-fiber membrane modules include an internal-perfusion type in which a liquid passes through the inside of a hollow-fiber membrane and an external-perfusion type in which a liquid passes through a periphery (outside) of a hollow-fiber membrane depending on the difference in passage paths of liquid. Patent Documents 1 and 2 disclose degassing modules using the external-perfusion hollow-fiber membrane module.

Such a hollow-fiber membrane module may be provided for an inkjet discharge apparatus or a water purifying apparatus, for example. In a large inkjet printer, a color filter manufacturing apparatus, or the like for business use of an inkjet discharge apparatus, since a large amount of chemical liquid is used, a chemical liquid tank is installed in an apparatus body, and thus the chemical liquid such as ink or photoresist liquid is fed from the chemical liquid tank at the time of operation of the inkjet discharge apparatus. At this time, when the chemical liquid contains air bubbles, there is a case where discharge accuracy is reduced or quality defects occur in a printed matter. In order to prevent this, therefore, there is a case where a degassing module is provided.

CITATION LIST

Patent Document

Patent Document 1: JP 2008-30023 A
Patent Document 2: JP 2012-161793 A

SUMMARY OF THE INVENTION

Problem to be Solved by the Invention

In hollow-fiber membrane modules disclosed in Patent Documents 1 and 2, a hollow-fiber membrane (hollow fiber member, hollow fiber) is disposed in a state of extending in a straight line, and both ends thereof are connected to a potting portion. However, in this configuration, for example, when the density of the hollow-fiber membrane increases, there is a possibility that a liquid hardly enters between the hollow-fiber membranes in some cases, and thus there is a possibility that it is difficult to effectively perform degassing or the like in some cases.

The invention has been made in view of the above circumstances, and an object thereof is to provide an external-perfusion hollow-fiber membrane module that can effectively perform degassing or the like.

Means for Solving Problem

In order to solve the above problems, the invention provides the following aspects.

(1) An external-perfusion hollow-fiber membrane module including: a hollow-fiber membrane bundle including a plurality of hollow-fiber membranes; and a casing that houses the hollow-fiber membrane bundle, wherein the hollow-fiber membrane bundle has one end that is fixed to an inside of the casing by a potting portion in an open state, and the external-perfusion hollow-fiber membrane module is configured to perform degassing on a gas contained in a liquid inside the casing, the gas being introduced into an inside from an outer surface of the hollow-fiber membrane.

(2) In the external-perfusion hollow-fiber membrane module according to the above aspect (1), the hollow-fiber membrane is characterized by being a composite membrane including a homogeneous layer with gas permeability and a porous support layer supporting the homogeneous layer.

(3) In the external-perfusion hollow-fiber membrane module according to the above aspect (1) or (2), the hollow-fiber membrane has an outer diameter of 280 µm or less.

(4) In the external-perfusion hollow-fiber membrane module according to any one of the above aspects (1) to (3), the hollow-fiber membrane has fracture strength of 0.5 N/fil or more and has fracture elongation of 50% or more.

(5) In the external-perfusion hollow-fiber membrane module according to any one of the above aspects (1) to (4), the hollow-fiber membrane bundle has a filling rate of from 20 to 50% in a cross section of the casing.

(6) In the external-perfusion hollow-fiber membrane module according to any one of the above aspects (1) to (5), the hollow-fiber membrane bundle in the casing has one end side that is provided with a first port communicating with the inside of the casing to pass a liquid therethrough, and the hollow-fiber membrane bundle in the casing has the other end side that is provided with a second port communicating with the inside of the casing to pass a liquid therethrough.

(7) In the external-perfusion hollow-fiber membrane module according to the above aspect (6), the first port is an outflow port having an outlet through which the liquid contained in the casing flows out, the outlet being disposed at a position spaced from a center of the casing, the second port is an inflow port having an inlet through which a liquid flows into the casing, and the external-perfusion hollow-fiber membrane module is configured such that a large quantity of liquid flowing into the casing through the inlet of the inflow port flow from a region opposite to a region, in which the outlet is formed, across the center of the casing, than the region in which the outlet is formed.

(8) In the external-perfusion hollow-fiber membrane module according to the above aspect (7), the inlet is disposed on a straight line extending in an extending direction of the hollow-fiber membrane bundle in which the hollow-fiber membrane bundle extends to the inside of the casing from the potting portion through the center of the casing, the inside of the casing is disposed with a dispersion plate having openings through which the liquid flowing from the inlet passes, and the dispersion plate is formed such that an opening area of the opening formed in the region opposite to the region, in which the outlet is formed, across the center of the casing is larger than an opening area of the opening formed in the region in which the outlet is formed.

(9) In the external-perfusion hollow-fiber membrane module according to any one of the above aspects (1) to (5), the module further includes a pipe member that communicates with the inside of the casing through an opening through which a liquid flows into the casing or the liquid contained in the casing flows out, wherein the pipe member is installed to extend along an extending direction of the hollow-fiber membrane bundle in which the hollow-fiber membrane bundle extends to the inside of the casing from the potting portion through the center of the casing.

(10) In the external-perfusion hollow-fiber membrane module according to the above aspect (9), the opening in the pipe member is formed on an outer peripheral surface of the pipe member.

(11) In the external-perfusion hollow-fiber membrane module according to the above aspect (9) or (10), the opening in the pipe member is an inlet through which a liquid flows into the casing, and is opened toward one end of the hollow-fiber membrane bundle in the casing, and the hollow-fiber membrane bundle in the casing has the other end side at which an outflow port is provided, the outflow port having an outlet through which a liquid contained in the casing flows out.

(12) In the external-perfusion hollow-fiber membrane module according to the above aspect (11), the outlet of the outflow port is formed at a position not overlapping with a height position of the other end of the hollow-fiber membrane bundle in a direction perpendicular to an extending direction of the hollow-fiber membrane bundle in which the hollow-fiber membrane bundle extends to the inside of the casing from the potting portion.

(13) In the external-perfusion hollow-fiber membrane module according to the above aspect (9), the opening in the pipe member is an inlet through which a liquid flows into the casing, the hollow-fiber membrane bundle in the casing has the other end side that is provided with a liquid introduction portion through which a liquid flows in along the hollow-fiber membrane bundle at an outside of the pipe member, and the hollow-fiber membrane bundle in the casing has one end side that is provided with an outflow port having an outlet through which the liquid contained in the casing flows out.

(14) In the external-perfusion hollow-fiber membrane module according to the above aspect (13), the opening in the pipe member is formed on an outer peripheral surface of the pipe member, and a plurality of openings are formed in an axial direction of the pipe member, and the openings are formed to have a smaller opening area at the one end side of the hollow-fiber membrane bundle compared to the opening area at the other end side thereof.

(15) In the external-perfusion hollow-fiber membrane module according to the above aspect (13) or (14), the liquid introduction portion includes a plurality of liquid passage ports arranged in a circumferential direction of the pipe member when viewed in the axial direction of the pipe member.

(16) In the external-perfusion hollow-fiber membrane module according to any one of the above aspects (13) to (15), the plurality of openings in the pipe member are formed side by side at predetermined intervals in the axial direction and the circumferential direction on the outer peripheral surface of the pipe member, and are formed on the outer peripheral surface of the pipe member.

(17) In the external-perfusion hollow-fiber membrane module according to any one of the above aspects (1) to (16), the hollow-fiber membrane is folded back in a U-shape in the hollow-fiber membrane bundle, and both ends thereof are buried in the potting portion, whereby the one end of the hollow-fiber membrane bundle is fixed to the inside of the casing by the potting portion.

(18) In the external-perfusion hollow-fiber membrane module according to any one of the above aspects (1) to (17), the other end of the hollow-fiber membrane bundle has substantially the same height position in an extending direction of the hollow-fiber membrane bundle in which the hollow-fiber membrane bundle extends to the inside of the casing from the potting portion.

(19) In the external-perfusion hollow-fiber membrane module according to any one of the above aspects (1) to (18), the hollow-fiber membrane bundle has at least one place, which is provided with a warp fiber extending in a direction perpendicular to an extending direction to connect the plurality of the hollow-fiber membranes to each other, in the extending direction of the hollow-fiber membrane bundle in which the hollow-fiber membrane bundle extends to the inside of the casing from the potting portion.

(20) In the external-perfusion hollow-fiber membrane module according to any one of the above aspects (1) to (19), the casing has a cylindrical shape.

(21) An inkjet printer including the hollow-fiber membrane module described above.

Effect of the Invention

According to the invention, since a hollow-fiber membrane bundle is fixed to the inside of a casing at one end thereof and the other end thereof is a free end, a liquid easily enters between the hollow-fiber membranes, and degassing or gas-liquid mixing can be effectively performed. In addition, since one potting portion exists in the casing, it is possible to suppress production costs and achieve miniaturization.

In the case of the configuration (2) described above, from the configuration where the homogeneous layer with the gas permeability is protected by the porous support layer, it is possible to prevent flaws in a working process and provide stable performance.

In the case of the configuration (3) described above, when the liquid flows to the outside of the hollow-fiber membrane, it is possible to further effectively form a flow channel in an insertion state of the hollow-fiber membrane.

In the case of the configuration (4) described above, the strength necessary for a process of aligning the length of the hollow-fiber membrane bundle is obtained, and thus it is possible to prevent damage in a production process and perform an effective and inexpensive membrane bundle forming process.

In the case of the configuration (5) described above, it is possible to provide appropriate voids between the hollow-fiber membranes, the void being required to effectively flow the liquid to the outside of the hollow-fiber membrane.

In the case of the configuration (6) described above, the flow channel of liquid is formed over one end from the other end of the hollow-fiber membrane bundle, and thus it is possible to perform the degassing or the gas-liquid mixing using effectively the hollow-fiber membrane bundle over the wide range and to improve the efficiency of the degassing or the gas-liquid mixing.

In the case of the configuration (7) described above, the liquid can easily spread throughout the hollow-fiber membrane bundle, and thus it is possible to improve the efficiency of the degassing or gas-liquid mixing.

In the case of the configuration (8) described above, since the flow channel through which the liquid can easily spread throughout the hollow-fiber membrane bundle can be formed by disposing the dispersion plate in the casing, it is possible to improve the efficiency of the degassing or the gas-liquid mixing while improving the production efficiency.

In the case of the configuration (9) described above, since the flow channel of liquid is easily formed along the direction perpendicular to the extending direction of the hollow-fiber membrane bundle by the opening formed in the pipe member, the shape of the hollow-fiber membrane bundle hardly collapses, and the degassing or the gas-liquid mixing can be stably performed. Furthermore, since the flow of the liquid flows over the widespread range of the hollow-fiber membrane bundle from the opening, the degassing or the gas-liquid mixing can be effectively performed.

In the case of the configuration (10) described above, since the flow channel of liquid is reliably formed along the direction perpendicular to the extending direction of the hollow-fiber membrane bundle, the shape of the hollow-fiber membrane bundle hardly collapses, and the degassing or the gas-liquid mixing can be suitably performed.

In the case of the configuration (11) described above, the flow channel of liquid is formed over the other end from one end of the hollow-fiber membrane bundle, and thus it is possible to perform the degassing or the gas-liquid mixing using effectively the hollow-fiber membrane bundle over the wide range and to improve the efficiency of the degassing or the gas-liquid mixing. In addition, since the liquid flows toward a root portion of the hollow-fiber membrane bundle and excessive diffusion of the hollow-fiber membrane bundle can be suppressed, the liquid can easily spread throughout the hollow-fiber membrane bundle and the efficiency of the degassing or the gas-liquid mixing can be improved.

In the case of the configuration (12) described above, it is possible to perform the degassing or the gas-liquid mixing using effectively the hollow-fiber membrane bundle over the wide range as much as possible and to improve the efficiency of the degassing or the gas-liquid mixing.

In the case of the configuration (13) described above, the flow channel of liquid is formed over one end from the other end of the hollow-fiber membrane bundle, the flow channel of liquid is easily formed along the direction perpendicular to the extending direction of the hollow-fiber membrane bundle by the pipe member, and thus it is possible to perform the degassing or the gas-liquid mixing using effectively the hollow-fiber membrane bundle over the wide range as much as possible and to improve the efficiency of the degassing or the gas-liquid mixing.

In the case of the configuration (14) described above, it is possible to perform the degassing or the gas-liquid mixing using effectively the hollow-fiber membrane bundle over the wide range as much as possible and to improve the efficiency of the degassing or the gas-liquid mixing.

In the case of the configuration (15) described above, it is possible to perform the degassing or the gas-liquid mixing using effectively the hollow-fiber membrane bundle over the wide range as much as possible and to improve the efficiency of the degassing or the gas-liquid mixing.

In the case of the configuration (16) described above, it is possible to perform the degassing or the gas-liquid mixing using effectively the hollow-fiber membrane bundle over the wide range as much as possible and to improve the efficiency of the degassing or the gas-liquid mixing.

In the case of the configuration (17) described above, since a desired density of the hollow-fiber membrane can be ensured by a small number of hollow-fiber membranes, the production efficiency can be improved. In addition, since the hollow-fiber membrane exhibits the U-shape, and a standing state is easily held, the excessive diffusion of the hollow-fiber membrane bundle can be suppressed, whereby the liquid can easily spread throughout the hollow-fiber membrane bundle and the efficiency of the degassing or the gas-liquid mixing can be improved.

In the case of the configuration (18) described above, the liquid is difficult to disproportionately flow, and the diffusion of the hollow-fiber membrane bundle can be suppressed, whereby the liquid can easily spread throughout the hollow-fiber membrane bundle and the efficiency of the degassing or the gas-liquid mixing can be improved. In particular, it is possible to suitably suppress the diffusion of the hollow-fiber membrane bundle when the liquid flows toward a front portion as the other portion of the hollow-fiber membrane bundle along the extending direction of the hollow-fiber membrane bundle, for example.

In the case of the configuration (19) described above, the standing state of the hollow-fiber membrane bundle is reliably held with ease, and the excessive diffusion of the hollow-fiber membrane bundle can be suitably suppressed. When viscosity of the liquid is high, since the large diffusion of the hollow-fiber membrane bundle is easily realized, this configuration effectively functions when the viscosity of the liquid is high in particular.

In the case of the configuration (20) described above, the fluidity of liquid is improved, and thus the efficiency of the degassing or the gas-liquid mixing can be improved.

MODE(S) FOR CARRYING OUT THE INVENTION

Embodiments of the invention will be described below with reference to the accompanying drawings.

First Embodiment

Figure 1:
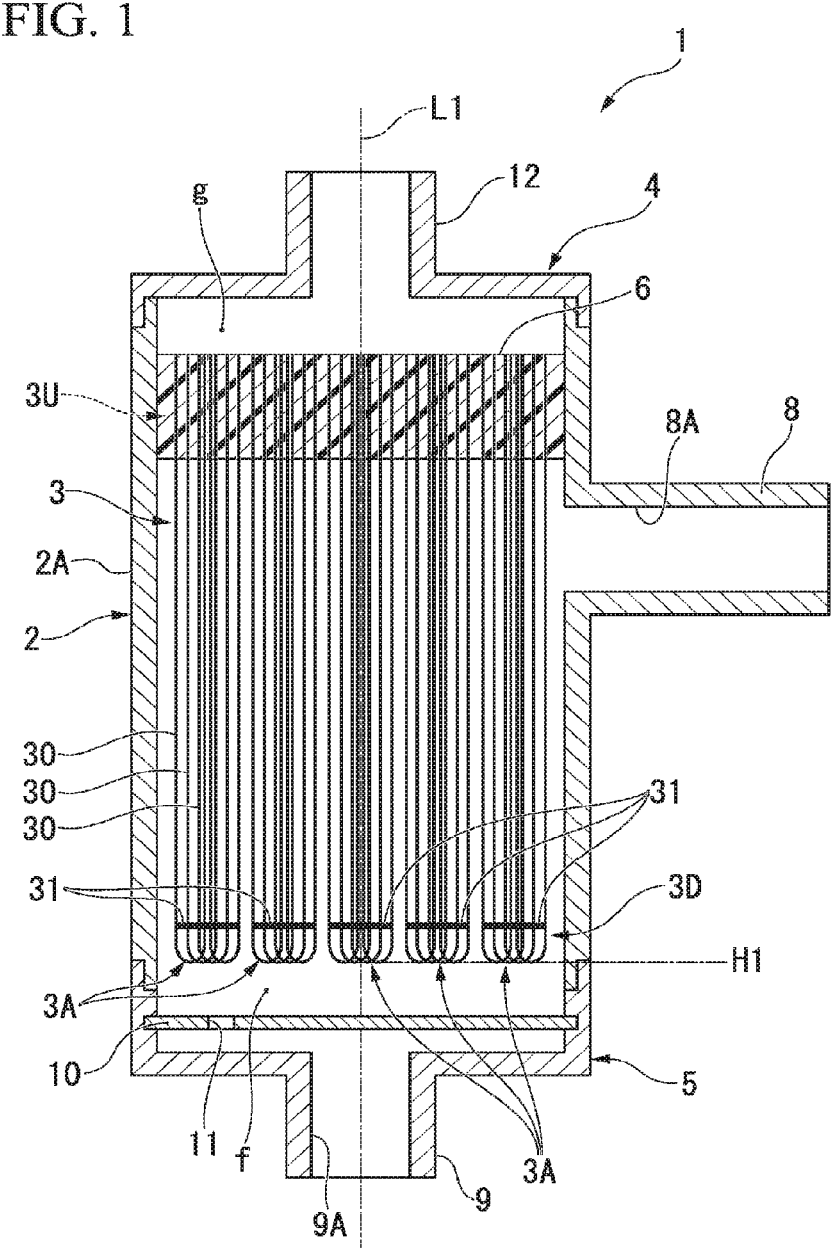
FIG. 1 is a cross-sectional view of a degassing module according to a first embodiment of the invention.
Figure 2:
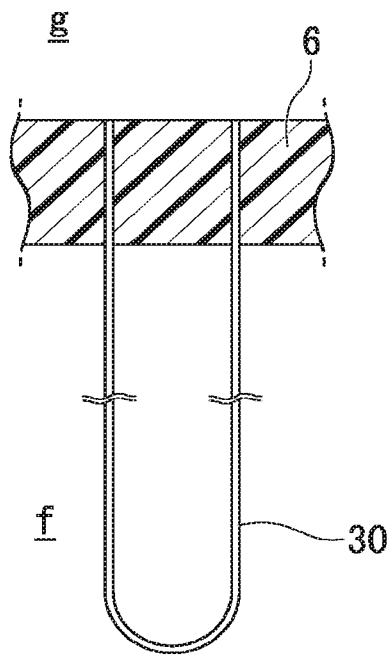
FIG. 2 is a cross-sectional view for describing a state where a hollow-fiber membrane in a hollow-fiber membrane bundle included in the degassing module according to the first embodiment of the invention is fixed to a potting portion.

FIG. 1 illustrates a degassing module 1 of an external perfusion type according to a first embodiment of the invention. The degassing module 1 includes a casing 2 and a hollow-fiber membrane bundle 3 housed in the casing 2. The casing 2 includes a cylindrical casing body 2A, a first cover member 4 for covering one end opening of the casing body 2A, and a second cover member 5 for covering the other end opening of the casing body 2A.

The casing 2 is formed to have substantially a columnar appearance by coupling of the casing body 2A, the first cover member 4, and the second cover member 5. The degassing module 1 is intended to be used in an inkjet discharge apparatus such as an inkjet printer or a color filter manufacturing apparatus, but there is no specific limitation on its use.

In the drawing, reference numeral L1 indicates a central axis of the casing 2 (hereinafter, simply also referred to as a center) extending in an axial direction of the casing 2 through a cross-sectional center of the casing 2 along a direction perpendicular to the axial direction of the casing 2 (casing body 2A). Here, the "cross-sectional center of the casing 2" means a center of gravity in a cross section perpendicular to an extending direction of a hollow-fiber membrane 30 (longitudinal direction of the casing 2). In this embodiment, the first cover member 4 is disposed at an upper side, and the second cover member 5 is disposed at a lower side.

In this embodiment, the first cover member 4 side and the second cover member 5 side will be referred to as an upper side and a lower side along the central axis L1, respectively. In addition, sometimes, a direction perpendicular to the central axis L1 is referred to as a radial direction, and a direction going around the central axis L1 is referred to as a circumferential direction.

The casing body 2A, the first cover member 4, and the second cover member 5 are preferably formed from a material having mechanical strength and durability, and may be formed from polycarbonate, polysulfone, polyolefin, PVC (polyvinyl chloride), acrylic resin, ABS resin, or modified PPE (polyphenylene ether), for example.

The hollow-fiber membrane bundle 3 of this embodiment is configured to have a plurality of small bundles 3A, the small bundle 3A being formed by bundling of the plurality of hollow-fiber membranes 30. The hollow-fiber membrane bundle 3 is fixed to the inside of the casing 2 by the potting portion 6 only at an upper end (one end) 3U in an open state, and the hollow-fiber membrane bundle 3 extends downward along the central axis L1 from the potting portion 6. By the potting portion 6, a space which is formed by the casing body 2A, the first cover member 4, and the second cover member 5 is partitioned into an air chamber g and a liquid chamber f. The hollow-fiber membrane bundle 3 is extensively provided inside the casing 2 over the circumferential direction and the radial direction.

As illustrated in FIG. 1, in each of the small bundles 3A, the hollow-fiber membrane 30 is folded back in a U-shape, both ends thereof are buried in the potting portion 6, and both ends thereof are in a state of being opened to the air chamber g. The "open state" means that the interior of each hollow-fiber membrane 30 is in a state of being communicated with the air chamber g through the opened one end. That is, in this embodiment, both ends of the hollow-fiber membrane 30 form an upper end (one end) and is fixed the inside of the casing 2 by the potting portion 6 in the open state.

Meanwhile, an outer surface portion of each hollow-fiber membrane 30 extending downward from the potting portion 6 is in a state of being exposed to the liquid chamber f, and a U-shaped bottom portion thereof is in a state of being directed downward. Accordingly, a lower end of each hollow-fiber membrane 30 (that is, hollow-fiber membrane bundle 3) is a free end. That is, in this embodiment, the U-shaped bottom portion of the hollow-fiber membrane 30 forms the lower end (the other end).

In this embodiment, the hollow-fiber membrane 30 is folded back into the U-shape and both ends thereof is buried in the potting portion 6, but a hollow-fiber membrane having one end being opened and the other end being closed may be provided such that one end thereof is buried in the potting portion 6 and the other end is a free end.

Each of the small bundles 3A is configured such that a warp fiber 31 extending in a direction perpendicular to the central axis L1 is provided at a lower side portion thereof and the plurality of hollow-fiber membranes 30 are bundled by the warp fiber 31. In this embodiment, the warp fiber 31 is woven in a chain stitch type across the plurality of hollow-fiber membranes 30 to connect the plurality of hollow-fiber membranes 30 to each other, but the plurality of hollow-fiber membranes 30 may be connected to each other in other ways. The warp fiber 31 may be configured to connect the plurality of small bundles 3A to each other, and may be provided at a plurality of positions of the small bundle 3A. Furthermore, in this embodiment, the hollow-fiber membrane bundle 3 has the plurality of small bundles 3A, but may be in a state where the plurality of hollow-fiber membranes 30 are collectively bundled, without being divided into the plurality of small bundles 3A.

Furthermore, in this embodiment the warp fiber 31 is provided in the vicinity of the lower end of the small bundles 3A to connect the plurality of hollow-fiber membranes 30 to each other, but may be provided in the vicinity of the center of the small bundles 3A to connect the plurality of hollow-fiber membranes 30 to each other, for example. Further, an example where the small bundles 30 are connected to each other by the warp fiber 31 in the vicinity of the lower end thereof is described in this embodiment, but the small bundles 30 are preferably connected to each other in the vicinity of the center and at plurality of positions spaced from the vicinity of the center at certain intervals, from the viewpoint of preventing breakage of the small bundles 3A.

In addition, as is apparent from FIG. 1, in this embodiment, a lower end 3D of the hollow-fiber membrane bundle 3 has substantially the same height position H1 in the extending direction of the hollow-fiber membrane bundle 3 which is a direction along the central axis L1. Here, the "substantially the same" means that the error of the length of the hollow-fiber membrane bundle 3 is less than ±5% with respect to the average length of the hollow-fiber membrane bundle 3 in the casing 2.

A material of the hollow-fiber membrane 30 includes, for example, a resin containing one or more kinds of polyolefin (polyethylene, polypropylene, poly (4-methylpentene-1), or the like), fluorine-based resin (polytetrafluoroethylene, polyvinylidene fluoride, ethylene-tetrafluoroethylene copolymer, or the like), polystyrene-based resin, polysulfone-based resin, polyether ketone, polyether ether ketone, polycarbonate, cellulose derivatives, polyamide, polyester, and polymethacrylate, polyacrylate. In addition, the material may include copolymers of these resins or those obtained by introducing a substituent into a part. The polyolefin is preferred from the viewpoint of chemical resistance or consideration for environment load, and the polyethylene or the polypropylene are particularly preferred from the viewpoint of handling during a potting process or a low level of elution into a use solution.

In the casing 2, a first port 8 is provided at the upper end 3U (one end) side of the hollow-fiber membrane bundle 3 which is fixed to the potting portion 6, and allows liquid to pass by communicating with the liquid chamber f provided in the casing 2. Further, in the casing 2, a second port 9 is provided at the lower end 3D (the other end) side of the hollow-fiber membrane bundle 3 and allows liquid to pass by communicating with the liquid chamber f provided in the casing 2. Here, the "one end side" means a portion closer to one end than the other end, and "the other end side" means a portion closer to the other end than one end.

In this embodiment, the first port 8 is formed into a cylindrical shape having an outlet 8A through which the liquid contained in the casing 2 flows out and functions as an outflow port. Moreover, the first port 8 is located below the potting portion 6 and protrudes radially outward from an outer peripheral surface of the casing body 2A.

The second port 9 is formed into a cylindrical shape having an inlet 9A through which a liquid flows into the casing 2 and functions as an inflow port. Moreover, the second port 9 is located on the central axis L1 in the second cover member 5 and protrudes downward along the central axis L1 from the central portion of the second cover member 5. Specifically, in this embodiment, the second port 9 is formed such that the central axis L1 and the central axis of the second port 9 are disposed coaxially with each other. Here, the "central axis of the second port 9" means a line extending in a longitudinal direction of the second port 9 through a cross-sectional center (center of gravity) of the second port 9 along a direction perpendicular to an axial direction of the second port 9.

In this embodiment, a dispersion plate 10 is provided in the casing 2 such that a large quantity of liquid flowing into the casing 2 through the inlet 9A flow from a region opposite to a region, in which the outlet 8A is formed, across the center (the central axis L1) of the casing 2 in the radial direction of the central axis L1, than the region in which the outlet 8A of the first port 8 is formed.

Figure 3:
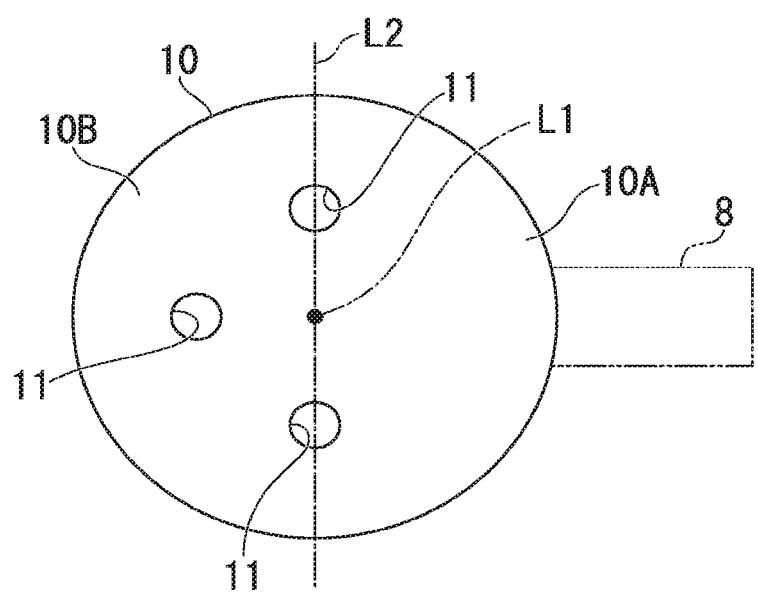
FIG. 3 is a diagram illustrating a dispersion plate included in the degassing module according to the first embodiment of the invention.

FIG. 3 is a plan view of the dispersion plate 10 when viewed from below.

As illustrated in FIG. 3, the dispersion plate 10 is formed into a disk shape and has a plurality of openings 11 through which liquid passes. The dispersion plate 10 is configured such that an outer peripheral portion thereof is fitted into an inner peripheral surface of the casing 2 in a liquid-tight manner to compart the liquid chamber f into two upper and lower chambers.

In this embodiment, as illustrated in FIG. 1, the dispersion plate 10 is disposed below the lower end 3D of the hollow-fiber membrane bundle 3.

As illustrated in FIG. 3, the dispersion plate 10 is formed such that an opening area of the opening 11 formed in a region opposite to the region, in which the first port 8 is formed, across the center (central axis L1) of the casing 2 is larger than an opening area of the opening 11 formed in the region, in which the outlet 8A of the first port 8 is formed, in the radial direction of the central axis L1.

Specifically, when viewed in the direction of the central axis L1 (in a case where the dispersion plate 10 is viewed from below), the dispersion plate 10 is divided into two parts by a straight line L2 that is perpendicular to the line connecting the center (central axis L1) of the casing 2 with the formation position (central axis of the first port 8) of the first port 8 and passes through the center (center of gravity) of the dispersion plate 10, and in this case, the total of opening areas of the openings 11 formed in a region 10B opposite to a region 10A in which the first port 8 is located is larger than those formed in the region 10A, as is apparent from the drawing. In FIG. 3, the first port 8 is indicated by a two-dot chain line for convenience of description. Here, the "central axis of the first port 8" means a line extending in a longitudinal direction of the first port 8 through the cross-sectional center (center of gravity) perpendicular to the axial direction of the first port 8.

More specifically, in this embodiment, three openings 11 are formed in the dispersion plate 10, two openings of three openings 11 extend over the region 10A and the region 10B, and the remaining one opening is formed in the region 10B. The opening 11 formed in the region 10B is located at a position facing the first port 8 (outlet 8A) across the central axis L1 in the radial direction of the central axis L1.

Furthermore, as illustrated in FIG. 1, in this embodiment, a cylindrical vacuum port 12 is formed at the central portion of the first cover member 4 located on the central axis L1 in the first cover member 4 to protrude upward along the central axis L1. The vacuum port 12 communicates with the air chamber g and is connected to a pull-in pump (vacuum pump) which is not illustrated in the drawing.

Figure 4:
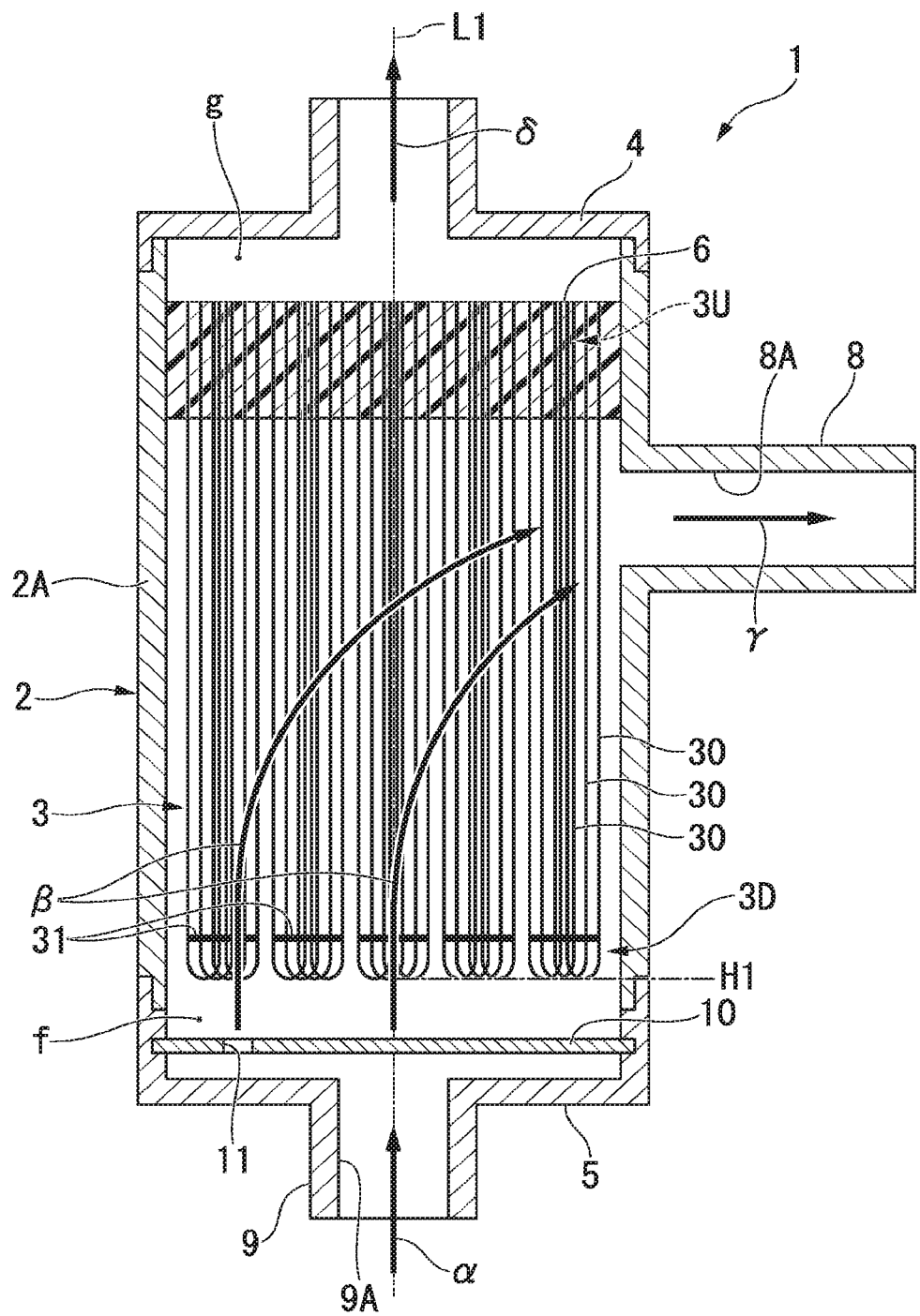
FIG. 4 is a diagram for describing a flow of liquid in the degassing module according to the first embodiment of the invention.

FIG. 4 illustrates the flow of liquid in the degassing module 1 according to this embodiment.

As illustrated in FIG. 4, first, the liquid flows into the casing 2 through the inlet 9A of the second port 9 as indicated by an arrow α in the degassing module 1.

Next, the liquid flowing into the casing 2 flows to the upper chamber out of the dispersion plate 10 of the liquid chamber f from the opening 11 of the dispersion plate 10, and diagonally flows toward the fist port 8 as indicated by an arrow β. A large quantity of liquid flowing from the opening 11 flows from the region opposite to the region in which the first port 8 side is formed.

In this case, since the first port 8 and the second port 9 are greatly spaced from each other in the extending direction of the hollow-fiber membrane bundle 3, the liquid flows toward the first port 8 while extensively coining in contact with the hollow-fiber membrane bundle 3 in the extending direction of the hollow-fiber membrane bundle 3. Then, the liquid is discharged to the outside through the outlet 8A as indicated by an arrow γ.

The liquid flowing into and out the casing 2 is forcedly fed by a pump (not illustrated) and flows into the casing 2. The pump may be disposed at a downstream side of the first port 8 to draw the liquid, and may be disposed at an upstream side of the second port 9 to push the liquid.

In addition, when the liquid flows into the liquid chamber f, the gas contained in the liquid is introduced into the hollow-fiber membrane 30 from the outer surface of the hollow-fiber membrane 30 exposed to the inside of the liquid chamber f, and the degassing is performed. The gas is introduced when the inside of the hollow-fiber membrane 30 is evacuated by the above-described vacuum pump. In FIG. 4, an arrow δ indicates a drawing direction of the vacuum pump.

The degassing module 1 of this embodiment described above includes the hollow-fiber membrane bundle 3 made up of the plurality of hollow-fiber membranes 30 and the casing 2 housing the hollow-fiber membrane bundle 3, and the hollow-fiber membrane bundle 3 is fixed to the inside of the casing 2 by the potting portion 6 at the upper end 3U, which is one end thereof. Then, the gas contained in the liquid inside the casing 2 is introduced into the hollow-fiber membrane 30 from the outer surface of the hollow-fiber membrane 30, and thus the degassing is performed.

In such a degassing module 1, since the hollow-fiber membrane bundle 3 is fixed to the inside of the casing 2 only at one end (upper end 3U) and the other end (lower end 3D) thereof is the free end, the liquid easily enters between the hollow-fiber membranes 30, and the degassing can be effectively performed. In addition, since one potting portion 6 exists in the casing 2, it is possible to suppress production costs and achieve miniaturization.

Furthermore, in the degassing module 1 according to this embodiment, the first port 8 is provided at the upper end 3U side at which hollow-fiber membrane bundle 3 is fixed by the potting portion 6 and which is one end of the hollow-fiber membrane bundle 3 in the casing 2, and allows the liquid to pass by communicating with the inside of the casing 2, and the second port 9 is provided at the lower end 3D side which is the other end of the hollow-fiber membrane bundle 3 in the casing 2 and allows the liquid to pass by communicating with the inside of the casing 2. With this configuration, the flow channel of the liquid is formed over one end (upper end 3U) from the other end (lower end 3D) of the hollow-fiber membrane bundle 3 in this embodiment, and thus it is possible to perform the degassing using effectively the hollow-fiber membrane bundle 3 over the wide range and to improve the efficiency of the degassing.

Furthermore, in the degassing module 1 according to this embodiment, the first port 8 is the outflow port, the outlet 8A is disposed at the position spaced from the center of the casing 2, and the second port 9 functions as the inflow port. Then, this embodiment is configured such that a large quantity of liquid flowing into the casing 2 through the inlet 9A flow from the region opposite to the region, in which the outlet 8A of the first port 8 serving as the outflow port is formed, across the center of the casing 2, than the region in which the outlet 8A is formed. With this configuration, in this embodiment, the liquid can easily spread throughout the hollow-fiber membrane bundle 3 and the efficiency of the degassing can be improved.

In addition, the inlet 9A is disposed on the central axis L1, and the dispersion plate 10 is disposed in the casing 2 and has the opening 11 through which the liquid flowing from the inlet 9A passes. Then, the dispersion plate 10 is formed such that the opening area of the opening 11 formed in the region 10B opposite to the region, in which the outlet 8A of the first port 8 serving as the outflow port is formed, across the center (central axis L1) of the casing 2 is larger than the opening area of the opening 11 formed in the opposite region 10A.

With this configuration, in this embodiment, since the dispersion plate 10 is disposed in the casing and thus the flow channel through which the liquid can easily spread throughout the hollow-fiber membrane bundle 3 can be formed, it is possible to improve the efficiency of the degassing while improving the production efficiency.

Furthermore, in the degassing module 1 according to this embodiment, the hollow-fiber membrane 30 in the hollow-fiber membrane bundle 3 is folded back in the U-shape, both ends thereof are buried in the potting portion 6, and thus the upper end 3U as one end of the hollow-fiber membrane bundle 3 is fixed to the inside of the casing 2 by the potting portion 6. With this configuration, since a desired density of the hollow-fiber membrane 30 can be ensured by a small number of hollow-fiber membranes 30 in this embodiment, the production efficiency can be improved. In addition, since the hollow-fiber membrane 30 exhibits the U-shape, and the standing state is easily held, the excessive diffusion of the hollow-fiber membrane bundle 3 can be suppressed, whereby the liquid can easily spread throughout the hollow-fiber membrane bundle 3 and the efficiency of the degassing can be improved.

Furthermore, in the degassing module 1 according to this embodiment, the lower end 3D as the other end of the hollow-fiber membrane bundle 3 has substantially the same height position H1 in the direction of the central axis L1. With this configuration, in this embodiment, the liquid is difficult to disproportionately flow, and the diffusion of the hollow-fiber membrane bundle 3 can be suppressed, whereby the liquid can easily spread throughout the hollow-fiber membrane bundle 3 and the efficiency of the degassing can be improved. In particular, this configuration can suitably suppress the diffusion of the hollow-fiber membrane bundle 3 when the liquid flows toward a front portion of the hollow-fiber membrane bundle 3 along the extending direction of the hollow-fiber membrane bundle 3, for example.

Furthermore, in the degassing module 1 according to this embodiment, the warp fiber 31 expending in the direction perpendicular to the direction of the central axis L1 is provided at the lower end 3D side of the hollow-fiber membrane bundle 3 in the direction of the central axis L1 to connect the plurality of hollow-fiber membranes 30 to each other. With this configuration, the standing state of the hollow-fiber membrane bundle 3 is reliably held with ease, and the excessive diffusion of the hollow-fiber membrane bundle 3 can be suitably suppressed. When viscosity of the liquid is high, the large diffusion of the hollow-fiber membrane bundle 3 is easily realized. Accordingly, particularly, this configuration effectively functions when the viscosity of the liquid is high, for example, in the case of using liquid ink or the like.

FIGS. 5A to 5D illustrate modification examples of the dispersion plate 10 described in the first embodiment. In the modification examples, the same configurations as the dispersion plate 10 according to the first embodiment denote the same numeral references as in the first embodiment.

Figure 5A:
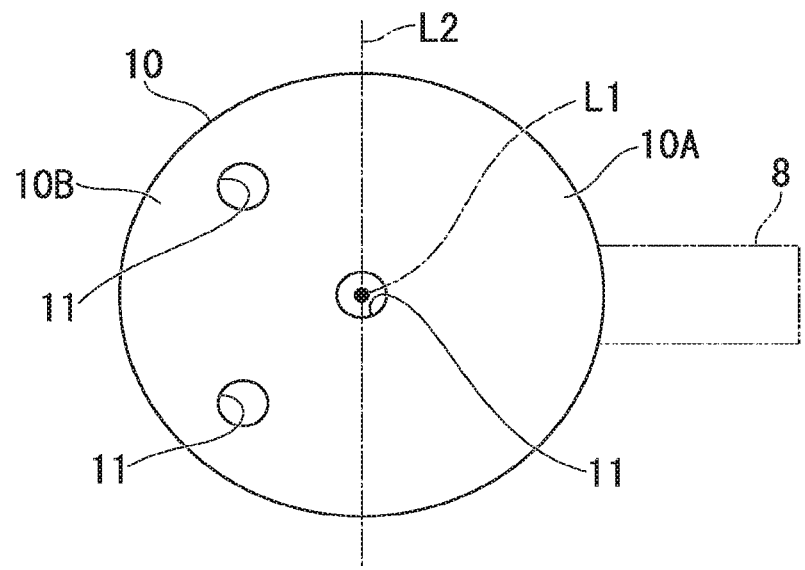
FIG. 5A is a diagram illustrating a modification example of the dispersion plate.

In FIG. 5A, three openings 11 are formed in the dispersion plate 10, two openings of three openings 11 are formed in the region 10B, and the remaining one opening is formed to extend over the region 10A and the region 10B on the central axis L1.

Figure 5B:
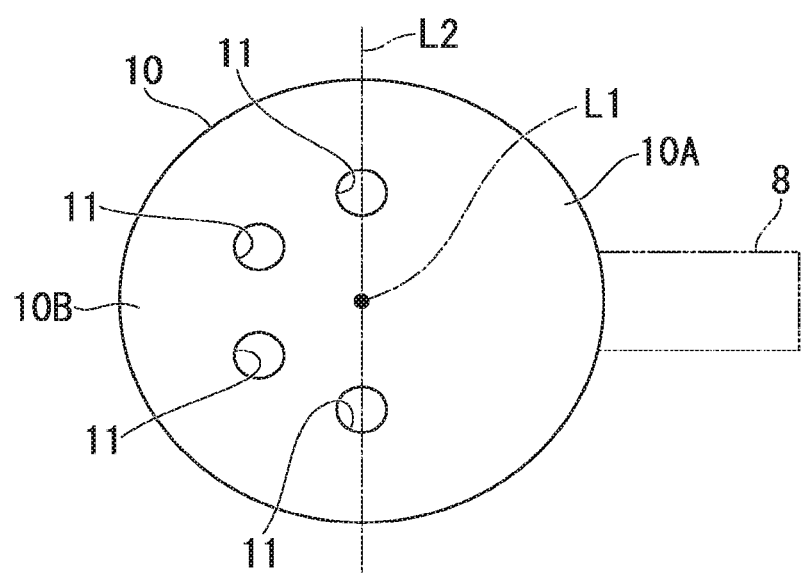
FIG. 5B is a diagram illustrating a modification example of the dispersion plate.

In FIG. 5B, four openings 11 are formed side by side in the circumferential direction. Two openings of four openings 11 are formed to extend over the region 10A and the region 10B, and the remaining two openings are formed in the region 10B.

Figure 5C:
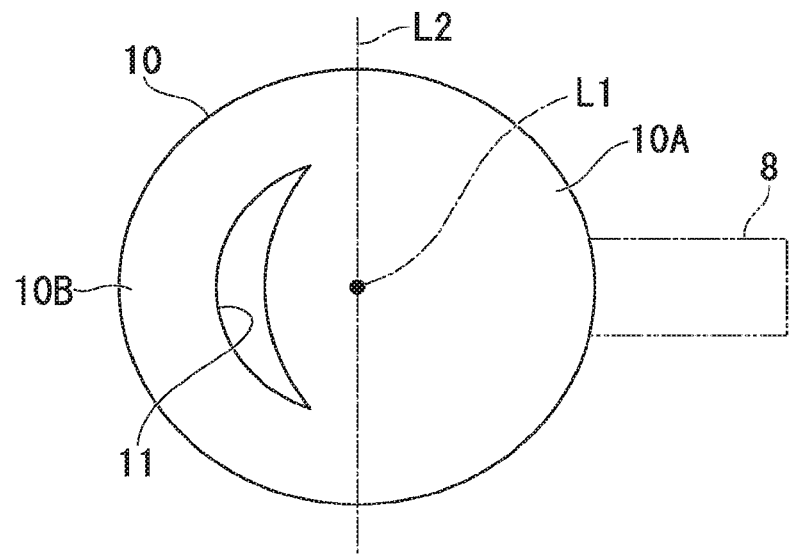
FIG. 5C is a diagram illustrating a modification example of the dispersion plate.

In FIG. 5C, the opening 11 is formed in an arc shape (crescent shape) extending along the circumferential direction of the dispersion plate 10, and is formed only in the region 10B. Both ends of the opening 11 are formed to be tapered.

Figure 5D:
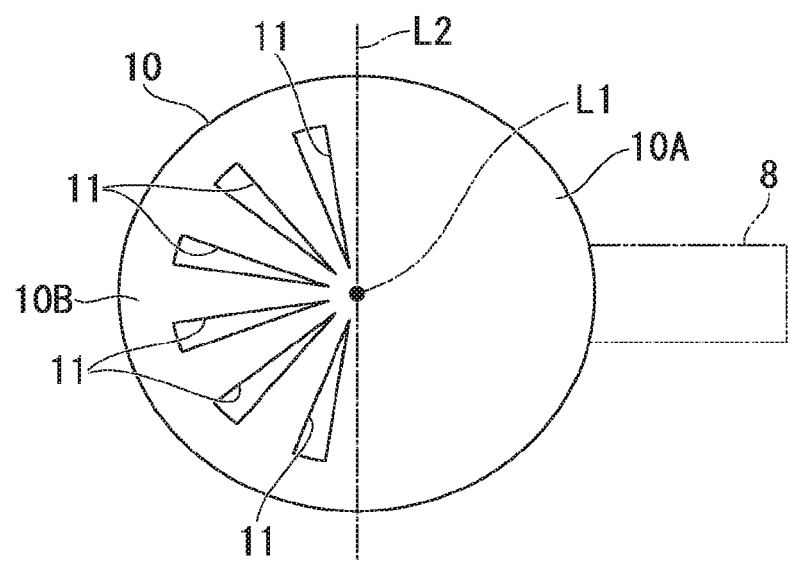
FIG. 5D is a diagram illustrating a modification example of the dispersion plate.

In FIG. 5D, a plurality of wedge-like openings 11 are formed radially outward from the center of the dispersion plate 10 only in the region 10B.

The shape of the opening 11 is not particularly limited, but is preferably a wedge shape in view of flow channel forming properties and flexibility of processing.

A ratio of the opening area in the region 10A to the opening area in the region 10B is preferably from 0:1/10 to 1/20:1/2.

The hollow-fiber membrane 30 has gas permeability in which a gas permeates between a hollow portion and the outside.

An outer diameter of the hollow-fiber membrane 30 is preferably 280 µm or less, and more preferably 250 µm or less. More specifically, the outer diameter is preferably in a range of from 250 to 150 µm, and more preferably in a range of from 220 to 180 µm. When the outer diameter of the hollow-fiber membrane 30 is in the above numerical range, it is possible to form effectively flow channels between the hollow-fiber membranes in the casing.

An inner diameter of the hollow-fiber membrane 30 is preferably 100 µm or more, and more preferably 120 µm or more. The inner diameter of the hollow-fiber membrane 30 is preferably 200 µm or less. More specifically, the inner diameter is preferably in a range of from 100 to 200 µm, and more preferably in a range of from 110 to 160 µm. When the inner diameter of the hollow-fiber membrane 30 is in the above numerical range, it is possible to house sufficiently the number of hollow-fiber membranes 30 in the casing 2 and maintain excellent degassing performance and durability.

A film thickness of the hollow-fiber membrane 30 is preferably in a range of from 20 to 70 µm, and more preferably in a range of from 25 to 55 µm.

When the film thickness is equal to or less than the upper limit value of the above range, the hollow-fiber membrane 30 in the casing 2 has superior durability when a pressure of the inside thereof is repeatedly reduced. When the film thickness is equal to or more than the lower limit value of the above range, degassing performance can be excellently maintained.

The film thickness of the hollow-fiber membrane is calculated by the following Equation (1) from the difference between the inner diameter and the outer diameter of the hollow-fiber membrane.

Film thickness of hollow-fiber membrane=(Outer diameter of hollow-fiber hollow−Inner diameter of hollow-fiber membrane)/2   (1)

The inner diameter and the outer diameter of the hollow-fiber membrane are actually measured as follows.

First, a number of hollow-fiber membranes are bundled, and the entire outside thereof is covered with a polyurethane resin and is then cured. Subsequently, the cured bundle is sliced along the radial direction of the hollow-fiber membrane such that the length in the longitudinal direction is several mm, whereby a flaky sample having a thickness of several mm is obtained. Then, a cross-sectional optical image of this sample is projected on a screen with, for example, a magnification of 100 times using projector. The outer diameter and inner diameter of each hollow-fiber membrane are measured in the projected image. The operation of measuring by cutting out the sample in this way is repeated five times or more, and the outer diameter and inner diameter of the hollow-fiber membrane are defined with an average value of all values.

The hollow-fiber membrane 30 is preferably a composite membrane having a homogeneous layer with gas permeability and a porous support layer supporting the homogeneous layer in that strength is superior, a dissolved gas can be effectively removed while leakage of liquid is suppressed, and degassing performance is superior.

A specific layer structure of the composite membrane is preferably a two-layer structure in which a porous support layer is provided on the inside or outside of a homogeneous layer or a three-layer structure in which a porous support layer is provided on the inside and the outside of the homogeneous layer, and the three-layer structure is more preferred in terms of strength and degassing performance.

A materials of the homogeneous layer may includes, for example, a silicone rubber-based resin such as polydimethylsiloxane or a copolymer of silicone and polycarbonate (polycarbonate); a polyolefin-based resin such as a copolymer of ethylene and α-olefin, poly-4-methylpentene-1, low density polyethylene, high density polyethylene, linear low density polyethylene, linear ultra-low density polyethylene, polypropylene, ionomer resin, ethylene-vinyl acetate copolymer, ethylene/(meth)acrylic acid copolymer, ethylene/(meth)methyl acrylate copolymer, or modified polyolefin (for example, unsaturated carboxylic acid such as homopolymer or a copolymer of olefin or maleic acid, fumaric acid, acid anhydride, or reactant of ester, metal salt, or the like); a fluorine-containing resin such as polyvinylidene fluoride or polytetrafluoroethylene; a cellulose-based resin such as ethyl cellulose; a polyphenylene oxide; poly-4-vinylpyridine; or an urethane resin. These resins may be used singly or may be used by blending two or more kinds. In addition, a copolymer of these resins can be also used.

Among them, the material of the homogeneous layer preferably includes the polyolefin-based resin, and more preferably the polyolefin-based resin having a density of from 0.850 to 0.910 g/cm$^3$. The homogeneous layer formed of the polyolefin-based resin having the density within the above range is superior in degassing performance even when a liquid to be treated passes at a high flow rate and has a suitable melting point or softening point in practice.

The density is measured based on JIS K 7112 (which is equal to regulation of ASTM D1505).

The polyolefin-based resin having the density of the above range has a melting point (Tm) which is approximately 40 to 100° C. as measured by a differential scanning calorimeter (DSC).

From the viewpoint of chemical resistance of the hollow-fiber membrane 30, the polyolefin-based resin forming the homogeneous layer is preferably an ethylene/α-olefin copolymer which is obtained by a copolymer of ethylene and α-olefins having 3 to 20 carbon atoms and has molecular weight distribution of 4.0 or less.

The α-olefins having 3 to 20 carbon atoms includes, for example, propylene (3 carbon atoms), isobutylene (4 carbon atoms), 1-butene (4 carbon atoms), 1-pentene (5 carbon atoms), 1-hexene (6 carbon atoms), 4-methyl-1-pentene (6 carbon atoms), or 1-octene (8 carbon atoms). As the α-olefins having 3 to 20 carbon atoms, α-olefins having 4 to 20 carbon atoms are preferred, α-olefins having 6 to 8 carbon atoms are more preferred, and the 1-hexene or the 1-octene is particularly preferred.

The α-olefins having 3 to 20 carbon atoms may be used singly or may be used in combination of two or more kinds.

The molecular weight distribution of the ethylene/α-olefin copolymer is preferably 4.0 or less as described above, more preferably 3.5 or less, and particularly preferably 3.0 or less. In this way, the ethylene/α-olefin copolymer having small molecular weight distribution is obtained by, for example, a method of copolymerizing using a metallocene catalyst. For example, it is obtained by a method of copolymerizing using an insite (single-site) catalyst (developed by Dow Chemical Co.) or a constrained geometry catalyst which is a type of so-called metallocene catalyst.

The molecular weight distribution is a ratio (Mw/Mn) of a mass-average molecular weight (Mw) to a number-average molecular weight (Mn). The mass-average molecular weight (Mw) and the number-average molecular weight (Mn) are determined by gel permeation chromatography (GPC) using polystyrene as a standard sample.

With respect to the ethylene/α-olefin copolymer obtained by the copolymer of the ethylene and the α-olefins having 3 to 20 carbon atoms, the α-olefins having 3 to 20 carbon atoms is preferably copolymerized using 10 mol % or more in total monomer in terms of chemical resistance, and more preferably copolymerized using from 20 to 40 mol %.

A melt flow rate (MFR) of the polyolefin-based resin forming the homogeneous layer is preferably from 0.1 to 5 g/10 min at 190° C., and more preferably from 0.3 to 2 g/10 min. When the MFR is equal to or more than the lower limit value of the above range, the homogeneous layer has superior formability. When the MFR is equal to or less than the upper limit value of the above range, the polyolefin-based resin is suppressed from flowing out toward the porous support layer during production of the hollow-fiber membrane, and thus the homogeneous layer can be formed with a uniform thickness and superior degassing performance.

The MFR is a value measured under a test temperature of 190° C. and a test load of 2.16 kgf (21.18 N) according to E condition of ASTM D1238.

A commercially available product of the ethylene/α-olefin copolymer suitable for the formation of the homogeneous layer may include, for example, "AFFINITY (registered trademark), produced by Dow Chemical Co." in which α-olefin has 8 carbon atoms or "Evolu (registered trademark), produced by Prime Polymer Co., Ltd.) in which α-olefin has 6 carbon atoms.

The polyolefin-based resin forming the homogeneous layer may be added with additives such as an antioxidant, an ultraviolet ray absorbent, a lubricant, an anti blocking agent, a colorant, or a flame retardant as a component other than the resin within the range not detrimental to the object of the invention, if necessary.

A material of the porous support layer may include, for example, a silicone rubber-based resin such as polydimethylsiloxane or a copolymer of silicone and polycarbonate (polycarbonate); a polyolefin-based resin such as poly-4-methylpentene-1, poly-3-methyl butene-1, low density polyethylene, or polypropylene; a fluorine-containing resin such as polyvinylidene fluoride or polytetrafluoroethylene; a cellulose-based resin such as ethyl cellulose; an polyphenylene oxide; poly-4-vinylpyridine; an urethane resin; polystyrene; polyether ether ketone; or polyether ketone. These resins may be used singly or may be used by blending two or more kinds. In addition, a copolymer of these resins can be also used.

A pore size of the porous support layer is preferably in a range of from 0.01 to 1 μm. When the pore size is equal to or less than the upper limit value of the above range, the inside of fine pores (pores through which gas permeates) of the homogeneous layer is made hardly wet, and thus the deterioration of the homogeneous layer due to chemicals contained in the liquid to be treated is reduced. When the pore size is equal to or more than the lower limit value of the above range, gas permeability increases and degassing performance becomes superior. In addition, porosity of the porous support layer is preferably from 30 to 80% by volume. When the porosity is equal to or more than the lower limit value of the above range, gas permeability is improved and degassing performance becomes superior. When the porosity is equal to or less than the upper limit value of the above range, the hollow-fiber membrane 30 is improved in mechanical strength such as pressure resistance.

The thickness of the homogeneous layer and the porous support layer is preferably determined such that the film thickness is within the above range, and the thickness of the homogeneous layer is preferably from 0.3 to 2 μm within the range. The thickness of the porous support layer is preferably from 20 to 70 μm, and more preferably from 25 to 55 μm. The thickness of the porous support layer used herein is a total thickness of a plurality of layers when the porous support layer is made up of the plurality of layers (for example, when the porous support layers are laminated with a total of two layers which are formed one by one on the inside and the outside of the homogeneous layer). When the thickness of the homogeneous layer and the porous support layer is equal to or more than the lower limit value of the above range, the hollow-fiber membrane 30 is improved in pressure resistance, mechanical strength, and the like. Moreover, when the thickness is equal to or less than the upper limit value of the above range, the hollow-fiber membrane 30 is improved in gas permeability and degassing performance becomes superior. In addition, the outer diameter of the hollow-fiber membrane 30 is prevented from being excessively larger, and the number of hollow-fiber membranes 30 can be sufficiently housed in the casing 2.

The thickness of the porous support layer can be actually measured from a projected cross-sectional image of a flaky sample in the same method as the actual measurement method of the inner diameter and the outer diameter of the hollow-fiber membrane described above and is obtained as an average value. That is, as described above, a flaky sample having a thickness of several mm is obtained, a cross-sectional optical image of the sample is projected on a screen with, for example, a magnification of 100 times using projector, and the thickness of the porous support layer of each hollow-fiber membrane is measured in the resulting projected image.

The operation of measuring by cutting out the sample in this way is repeated five times, and the thickness of the porous support layer of the hollow-fiber membrane is defined with an average value of all values.

However, since the thickness of the homogeneous layer is usually very small compared with the thickness of the porous support layer, the actual measurement is difficult in some cases. In this case, the film thickness of the hollow-fiber membrane is considered as the thickness of the porous support layer ("Film thickness of hollow-fiber membrane"="Thickness of porous support layer") as calculated by the above Equation (1).

The combination of the material of the homogeneous layer and the material of the porous support layer is not particularly limited, different kinds of resins may be used in combination, and resins of the same kind may be used in combination.

A composite hollow-fiber membrane having the homogeneous layer and the porous support layer can be produced by, for example, a known method including a multi-layer composite spinning process and a drawing pore formation process.

For example, a concentrical composite nozzle is used in which an inner layer nozzle portion, an intermediate layer nozzle portion, and an outer layer nozzle portion are sequentially formed, a molten resin is supplied to the outer layer nozzle portion and the inner layer nozzle portion to form the porous support layer, and a molten resin is supplied to the intermediate layer nozzle portion to form the homogeneous layer. Then, each molten resin is extruded from the concentrical composite nozzle and cooled to solidify, whereby an undrawn hollow fiber is obtained (multi-layer composite spinning process). Next, the undrawn hollow fiber is drawn, and a number of pores are formed on the inner layer and the outer layer (drawing pore formation process). Thus, a hollow-fiber membrane of a three-layer structure is obtained which includes the homogeneous layer and the porous support layers located on the inside and the outside of the homogeneous layer to support the homogeneous layer.

It is preferable that fracture strength of the above hollow-fiber membrane is 0.5 N/fil or more and fracture elongation thereof is 50% or more because of handling properties in a producing process of the hollow-fiber membrane module. It is preferable that the fracture strength is from 0.8 to 3 N/fil and the fracture elongation is from 70 to 400% or more, and it is more preferable that the fracture strength is from 1 to 2.5 N/fil and the fracture elongation is from 140 to 300% or more.

Here, the "fracture strength" means a fracture value of the hollow-fiber membrane when the hollow-fiber membrane is elongated by a load applied in the longitudinal direction.

The "fracture elongation" means an elongation before fracture of the hollow-fiber membrane when the hollow-fiber membrane is elongated by a load applied in the longitudinal direction.

The fracture strength and the fracture elongation of the hollow-fiber membrane can be measured by the following method.

(Fracture strength and Fracture Elongation of Hollow-fiber Membrane)

A tensile load is applied in a state where a hollow-fiber membrane with a test length of 2 cm is chucked with a chuck portion of a Tensilon type tensile tester (for example, UCT-1 T made by Orientech Co.), fracture elongation with variation in load is measured until the hollow-fiber membrane is fractured. This measurement is performed three times, and an average value of the loads causing the fracture of the hollow-fiber membrane is calculated.

In the cross section of the casing 2, a filling rate of the hollow-fiber membrane bundle 3 is preferably from 20 to 50%, and more preferably from 30 to 45%. When the filling rate of the hollow-fiber membranes equal to or more than the lower limit value, the size of the degassing module 1 becomes easily smaller and occurrence of the drift of liquid is easily suppressed in the degassing module 1. When the filling rate of the hollow-fiber membrane is equal to or less than the upper limit value, filling of the hollow-fiber membrane is facilitated, and it is possible to increase performance by filling more membranes in helping to ensure a proper flow channel.

The filling rate of the hollow-fiber membrane 30 in the cross-sectional casing 2 represents a total ratio (%) of cross-sectional areas of the filled hollow-fiber membrane to a cross-sectional area of the inside of the casing 2 when the degassing module 1 is cut in a direction perpendicular to the axial direction of the hollow-fiber membrane bundle 3.

When the casing 2 has the cylindrical shape, the size thereof is preferably from 20 to 60 cm in diameter and preferably from 60 to 250 cm in length.

Second Embodiment

Figure 6:
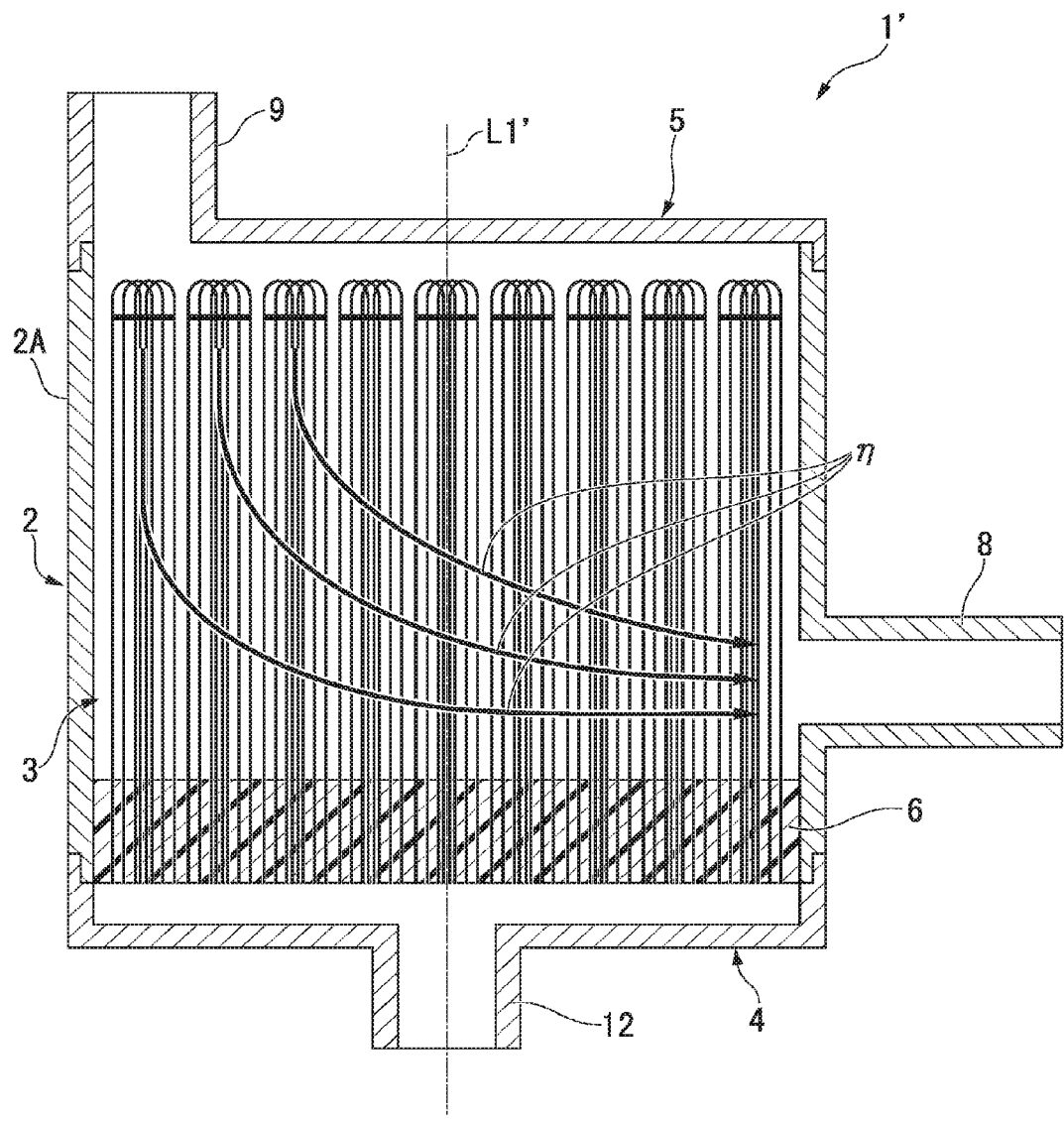
FIG. 6 is a cross-sectional view of a degassing module according to a second embodiment of the invention.

FIG. 6 illustrates a degassing module 1' according to a second embodiment of the invention. In the second embodiment, the same components as in the first embodiment denote the same numeral references, and the description thereof will not be presented.

In the degassing module 1' according to the second embodiment, a casing 2 does not include a dispersion plate 10. In addition, a first cover member 4 is disposed at a lower side to be formed with a vacuum port 12, and a second cover member is disposed at an upper side to be formed with a second port 9 functioning as an inflow port through which liquid flows in. Then, the degassing module 1' is configured to flow the liquid downward from the second port 9 toward the first port 8. Reference numeral L1' represents a central axis passing through a cross-sectional center of the casing 2 (casing body 2A). The casing 2 may be a circular cylindrical body in cross section and may be, for example, a rectangular hollow body in cross section.

The second port 9 is formed in a cylindrical shape that protrudes from the second cover member 5 along a direction of the central axis L1' and is formed at an end of the second cover member 5 spaced from the central axis L1'.

The first port 8 is formed in a cylindrical shape that protrudes from a side surface of the casing body 2A along a direction perpendicular to the central axis L1'. A hollow-fiber membrane bundle 3 is in a standing state of extending upward toward the second cover member 5 from a lower end fixed to a potting portion 6.

In the drawing, an arrow η represents a flow of liquid in the casing 2. Even in the configuration of this embodiment, the liquid flows toward the first port 8 while extensively coming in contact with the hollow-fiber membrane bundle 3 in an extending direction of the hollow-fiber membrane bundle 3 as referenced by the arrow η. Even in this embodiment, the same effect as that of the first embodiment is obtained.

Third Embodiment

Figure 7:
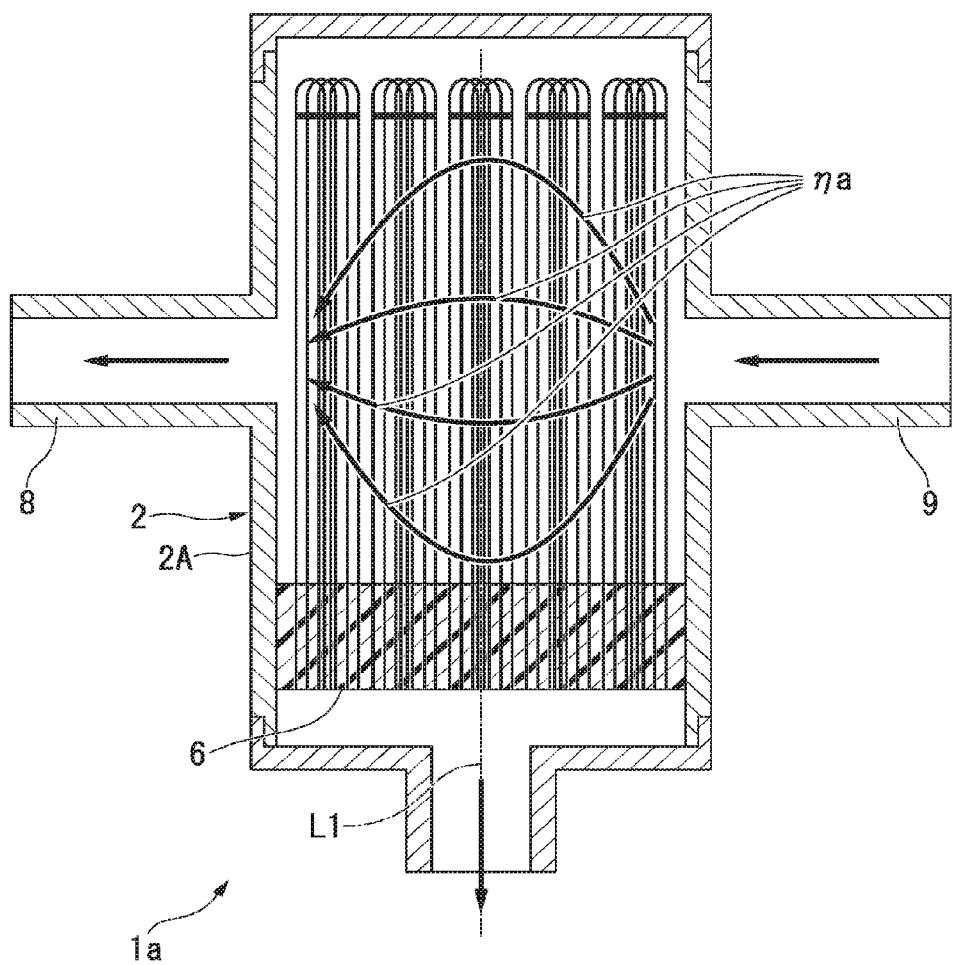
FIG. 7 is a cross-sectional view of a degassing module according to a third embodiment of the invention.

FIG. 7 illustrates an external-perfusion degassing module 1a according to a third embodiment of the invention. In the third embodiment, the same components as in the first embodiment denote the same numeral references, and the description thereof will not be presented.

In the degassing module 1a according to the third embodiment, a casing 2 does not include a dispersion plate 10. A first port 8 is located above a potting portion 6 to function as an outflow port through which liquid flows out, and protrudes radially outward from an outer peripheral surface of a casing body 2A. In addition, a second port 9 is located above the potting portion 6 to function as an inflow port through which liquid flows in, and protrudes radially outward from the outer peripheral surface of the casing body 2A. The first port 8 and the second port 9 are located at a distance from each other in a horizontal direction. In this embodiment, the first port 8 and the second port 9 are disposed such that a straight line connecting a central axis of the first port 8 with a central axis of the second port 9 is perpendicular to a central axis L1. Then, the degassing module 1a is configured to flow the liquid toward the first port 8 from the second port 9.

In the drawing, an arrow ηa represents a flow of liquid in the casing 2. Even in the configuration of this embodiment, the liquid flows toward the first port 8 while extensively coming in contact with the hollow-fiber membrane bundle 3 in an extending direction of the hollow-fiber membrane bundle 3 as referenced by the arrow ηa. Even in this embodiment, the same effect as that of the first embodiment is obtained.

Fourth Embodiment

Figure 8:
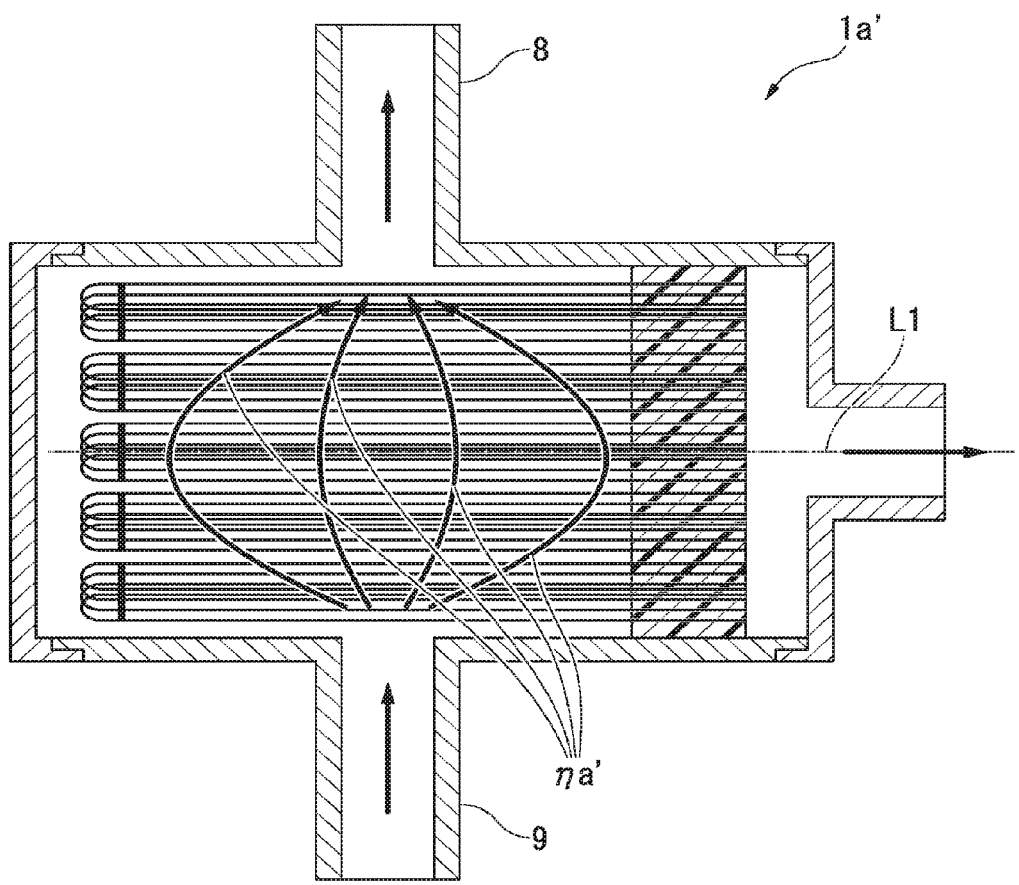
FIG. 8 is a cross-sectional view of a degassing module according to a fourth embodiment of the invention.

FIG. 8 illustrates an external-perfusion degassing module 1a' according to a fourth embodiment of the invention. In the fourth embodiment, the same components as in the first embodiment denote the same numeral references, and the description thereof will not be presented.

A degassing module 1a according to fourth embodiment is obtained by rotating 90° the degassing module 1a' according to the third. That is, a hollow-fiber membrane bundle 3 is configured to extend in a horizontal direction, and a first port 8 and a second port 9 are located at a distance from each other in a vertical direction. Then, the degassing module 1a is configured to flow the liquid toward the first port 8 from the second port 9.

In the drawing, an arrow ηa' represents a flow of liquid in a casing 2. Even in the configuration of this embodiment, the liquid flows toward the first port 8 while extensively coming in contact with the hollow-fiber membrane bundle 3 in an extending direction of the hollow-fiber membrane bundle 3 as referenced by the arrow ηa'. Even in this embodiment, the same effect as that of the first embodiment is obtained.

Fifth Embodiment

Figure 9:
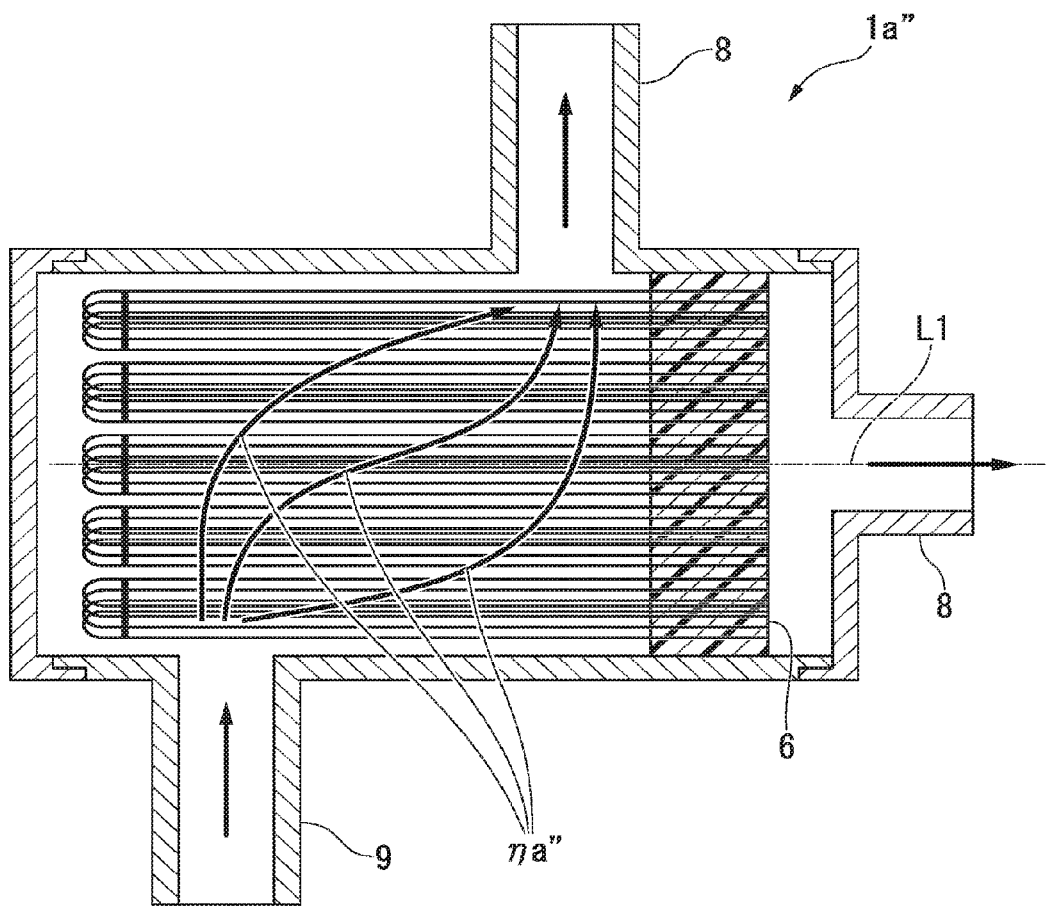
FIG. 9 is a cross-sectional view of a degassing module according to a fifth embodiment of the invention.

FIG. 9 illustrates an external-perfusion degassing module 1a' according to a fifth embodiment of the invention. In the fifth embodiment, the same components as in the first embodiment denote the same numeral references, and the description thereof will not be presented.

In the external-perfusion degassing module 1a" according to the fifth embodiment of the invention, a first port 8 is installed at one end side and a second port is installed at the other end side out of the degassing module 1a' according to the fourth embodiment. Then, the degassing module 1a" is configured to flow the liquid toward the first port 8 from the second port 9.

In the drawing, an arrow ηa" represents a flow of liquid in a casing 2. Even in the configuration of this embodiment, the liquid flows toward the first port 8 while extensively coming in contact with the hollow-fiber membrane bundle 3 in an extending direction of the hollow-fiber membrane bundle 3 as referenced by the arrow ηa". Even in this embodiment, the same effect as that of the first embodiment is obtained.

The first to fifth embodiments of the invention are described above, but the invention is not limited to the above embodiments and many various modifications can be added to the invention without departing from the spirit of the invention.

For example, although the first port 8 protrudes from the side surface of the casing in the first to fifth embodiments, the first port 8 may be configured to penetrate through the potting portion 6 from the first cover member 4, for example, thereby being opened to the liquid chamber f. Furthermore, the second port 9 is formed on the second cover member 5 in the first embodiment, but may be formed on the side surface of the casing 2.

In addition, although the second port 9 is defined as the inflow port and the first port 8 is the defined as the outflow port in the first to fifth embodiments, the first port 8 may be defined as an inflow port and the second port 9 may be defined as an outflow port.

In addition, although each of the casing body 2A, the first cover member 4, and the second cover member 5 of the casing 2 are described as a separate example in the first to fifth embodiments, these components may be integrated. For example, in the case of the first embodiment, the casing body 2A and the second cover member 5 are integrally configured, and only the first cover member 4 may be separately configured.

Furthermore, although the second port 9 (inlet 9A) as the inflow port and the first port 8 (outlet 8A) as the outflow port are disposed at the lower side and the upper side, respectively, in the above first embodiment and are disposed in the second embodiment on the contrary to the configuration of the first embodiment, such upper and lower sides or the like are not particularly limited. For example, the first port 8 and the second port 9 may be located at a distance from each other in the horizontal direction, and the hollow-fiber membrane bundle 3 may be configured to extend in the horizontal direction.

Although the first port 8 and the second port 9 are located at a distance from each other in the horizontal direction in the third embodiment, such a position of the first port 8 and the second port 9 is not particularly limited. For example, as in the above fifth embodiment, the first port 8 may be installed at one end side, and the second port 9 may be installed at the other end side.

The first port 8 and the second port 9 are configured to be installed at the upper side and the lower side, respectively, in the above fourth and fifth embodiments, but such a position of the first port 8 and the second port 9 is not particularly limited. For example, the first port 8 and the second port 9 may be configured to be installed at the lower side and the upper side, respectively.

The first port 8 and the second port 9 are configured to be installed at one end side and the other end side, respectively in the above fifth embodiment, but such a position of the first port 8 and the second port 9 is not particularly limited. For example, the second port 9 may be installed at one end side, and the first port 8 may be installed at the other end side.

The second embodiment is configured not to include the dispersion plate 10, but the dispersion plate 10 may be installed. In addition, the dispersion plate 10 may be formed such that the opening area of the opening 11 formed in the region 10B opposite to the region, in which the outlet 8A of the first port 8 serving as the outflow port is formed, across the center of the casing 2 is larger than the opening area of the opening 11 formed in the region 1 OA opposite to the region 10B.

Furthermore, in each of the first to fifth embodiments, the casing 2 may be the circular cylindrical body in cross section and may be, for example, the rectangular hollow body in cross section.

In addition, although the degassing module using the vacuum pump are described as an example of the hollow-fiber membrane module in each of the first to fifth embodiment, the invention can be also used as a gas-liquid mixing module which is configured to supply a pressurized gas into the module using a gas supply pump or the like instead of the vacuum pump. Even in this case, the water flows in the same manner as in each of the above embodiments, the same effect of the invention is exhibited that the liquid easily enters between the hollow-fiber membranes, and the efficiency of gas-liquid mixing can be improved.

Sixth Embodiment

Figure 10:
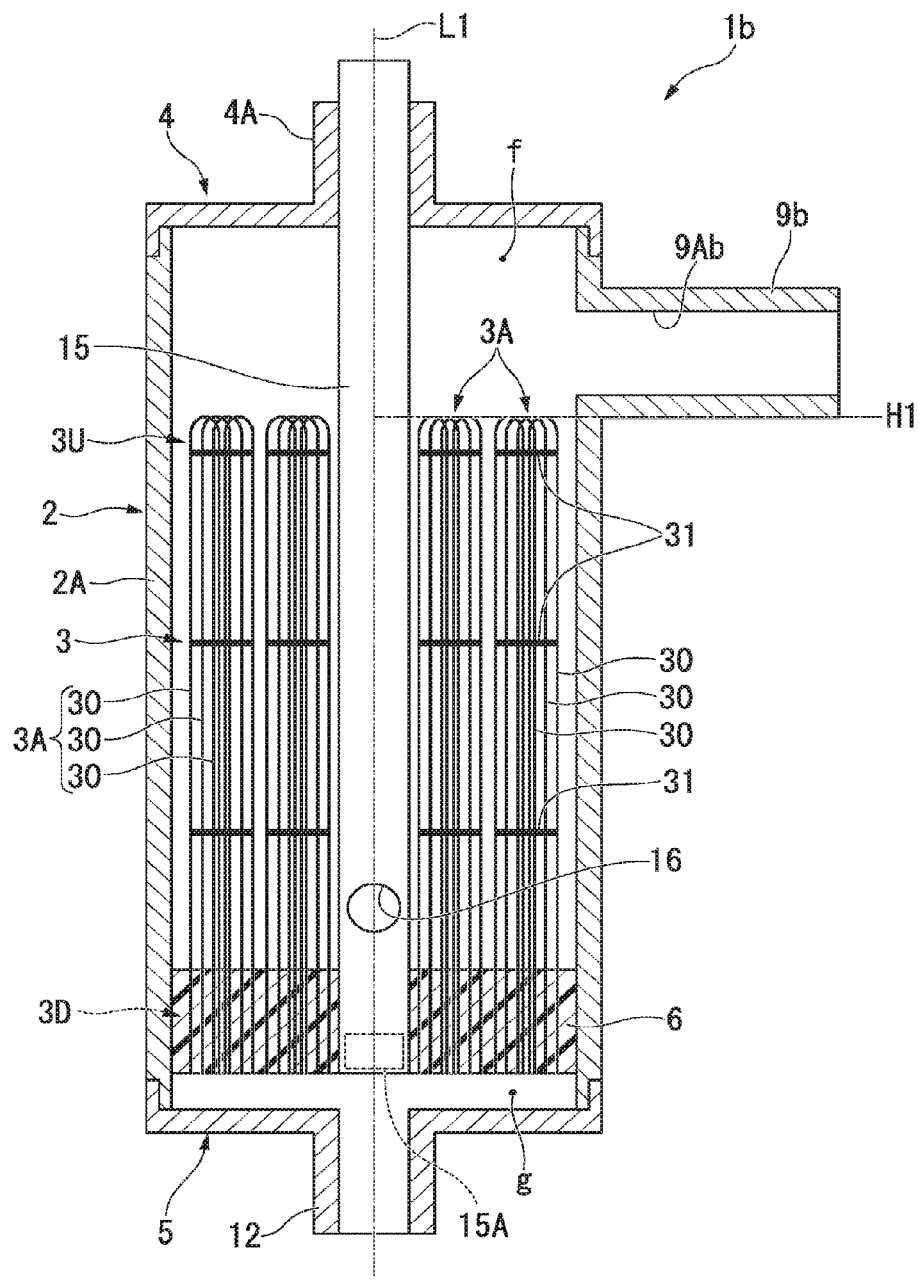
FIG. 10 is a cross-sectional view of a degassing module according to a sixth embodiment of the invention.

FIG. 10 illustrates a degassing module 1b of an external perfusion type according to a sixth embodiment of the invention. The degassing module 1b includes a casing 2 and a hollow-fiber membrane bundle 3 housed in the casing 2. The casing 2 includes a cylindrical casing body 2A and first and second cover members 4 and 5 for covering both end openings of the casing body 2A.

The casing 2 is formed to have substantially a columnar appearance by coupling of the casing body 2A, the first cover member 4, and the second cover member 5. The degassing module 1b is intended to be used in an inkjet discharge apparatus such as an inkjet printer or a color filter manufacturing apparatus, but there is no specific limitation on its use.

In the drawing, reference numeral L1 indicates a central axis of the casing 2 (hereinafter, simply also referred to as a center) extending in an axial direction of the casing 2 through a cross-sectional center along a direction perpendicular to the axial direction of the casing 2 (casing body 2A). In this embodiment, the first cover member 4 is disposed at an upper side, and the second cover member 5 is disposed at a lower side.

In this embodiment, the first cover member 4 side and the second cover member 5 side will be referred to as an upper side and a lower side along the central axis L1, respectively. In addition, sometimes, a direction perpendicular to the central axis L1 is referred to as a radial direction, and a direction going around the central axis L1 is referred to as a circumferential direction.

The casing body 2A, the first cover member 4, and the second cover member 5 are preferably formed from a material having mechanical strength and durability, and may be formed from polycarbonate, polysulfone, polyolefin, PVC (polyvinyl chloride), acrylic resin, ABS resin, or modified PPE (polyphenylene ether), for example.

The hollow-fiber membrane bundle 3 of this embodiment is configured to have a plurality of small bundles 3A, the small bundle 3A being formed by bundling of the plurality of hollow-fiber membranes 30. In this embodiment, the hollow-fiber membrane bundle 3 is fixed to the inside of the casing 2 by the potting portion 6 only at a lower end (one end) 3D in an open state, and the hollow-fiber membrane bundle 3 extends upward along the central axis L1 from the potting portion 6. By the potting portion 6, a space which is formed by the casing body 2A, the first cover member 4, and the second cover member 5 is partitioned into an air chamber g and a liquid chamber f.

Figure 11:
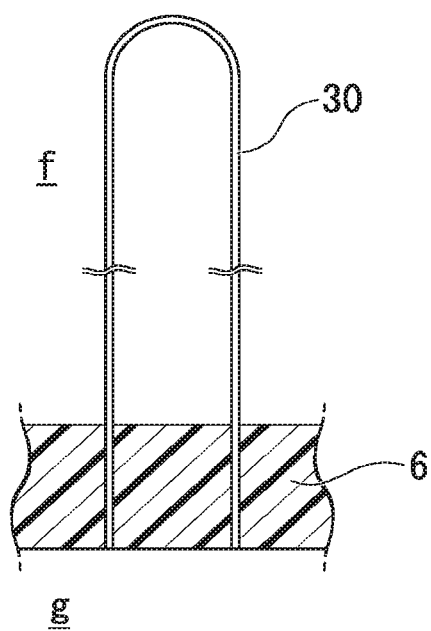
FIG. 11 is a cross-sectional view for describing a state where a hollow-fiber membrane in a hollow-fiber membrane bundle included in the degassing module according to the sixth embodiment of the invention is fixed to a potting portion.

As illustrated in FIG. 11, in each of the small bundles 3A, the hollow-fiber membrane 30 is folded back in a U-shape, both ends thereof are buried in the potting portion 6, and both ends thereof are in a state of being opened to the air chamber g. Thus, the interior of each hollow-fiber membrane 30 is in a state of being communicated with the air chamber g. That is, in this embodiment, both ends of the hollow-fiber membrane 30 form a lower end (one end) and is fixed the inside of the casing 2 by the potting portion 6 in the open state.

Meanwhile, an outer surface portion of each hollow-fiber membrane 30 extending upward from the potting portion 6 is in a state of being exposed to the liquid chamber f, and a U-shaped bottom portion thereof is in a state of being directed upward. Accordingly, an upper end of each hollow-fiber membrane 30 (that is, hollow-fiber membrane bundle 3) is a free end. That is, in this embodiment, the U-shaped bottom portion of the hollow-fiber membrane 30 forms the upper end (the other end).

In this embodiment, the hollow-fiber membrane 30 is folded back into the U-shape and both ends thereof is buried in the potting portion 6, but a hollow-fiber membrane having one end being opened and the other end being closed may be provided such that one end thereof is buried in the potting portion 6 and the other end is a free end.

When the hollow-fiber membrane 30 is in a standing state as in this embodiment, it is preferably formed in the U-shape to improve self-standing property.

Each of the small bundles 3A is configured such that three warp fibers 31 extending in a direction perpendicular to the central axis L1 are provided at an upper side portion thereof, a slightly lower side portion than from the upper side portion, and a lower side portion from an intermediate portion in a vertical direction in total and that the plurality of hollow-fiber membranes 30 are bundled by the warp fibers 31. In this embodiment, the warp fibers 31 are woven in a chain stitch type across the plurality of hollow-fiber membranes 30 to connect the plurality of hollow-fiber membranes 30 to each other, but the plurality of hollow-fiber membranes 30 may be connected to each other in other ways.

The warp fibers 31 may be configured to connect the plurality of small bundles 3A to each other, and one warp fiber 31 may be provided in only one proper place of the small bundle 3A.

In addition, the hollow-fiber membrane bundle 3 includes the plurality of small bundles 3A in this embodiment, but may be in a state where the plurality of hollow-fiber membranes 30 are collectively bundled, without being divided into the plurality of small bundles 3A.

In addition, as is apparent from FIG. 11, in this embodiment, an upper end 3U of the hollow-fiber membrane bundle 3 has substantially the same height position H1 in the extending direction of the hollow-fiber membrane bundle 3 which is a direction along the central axis L1.

Figure 12:
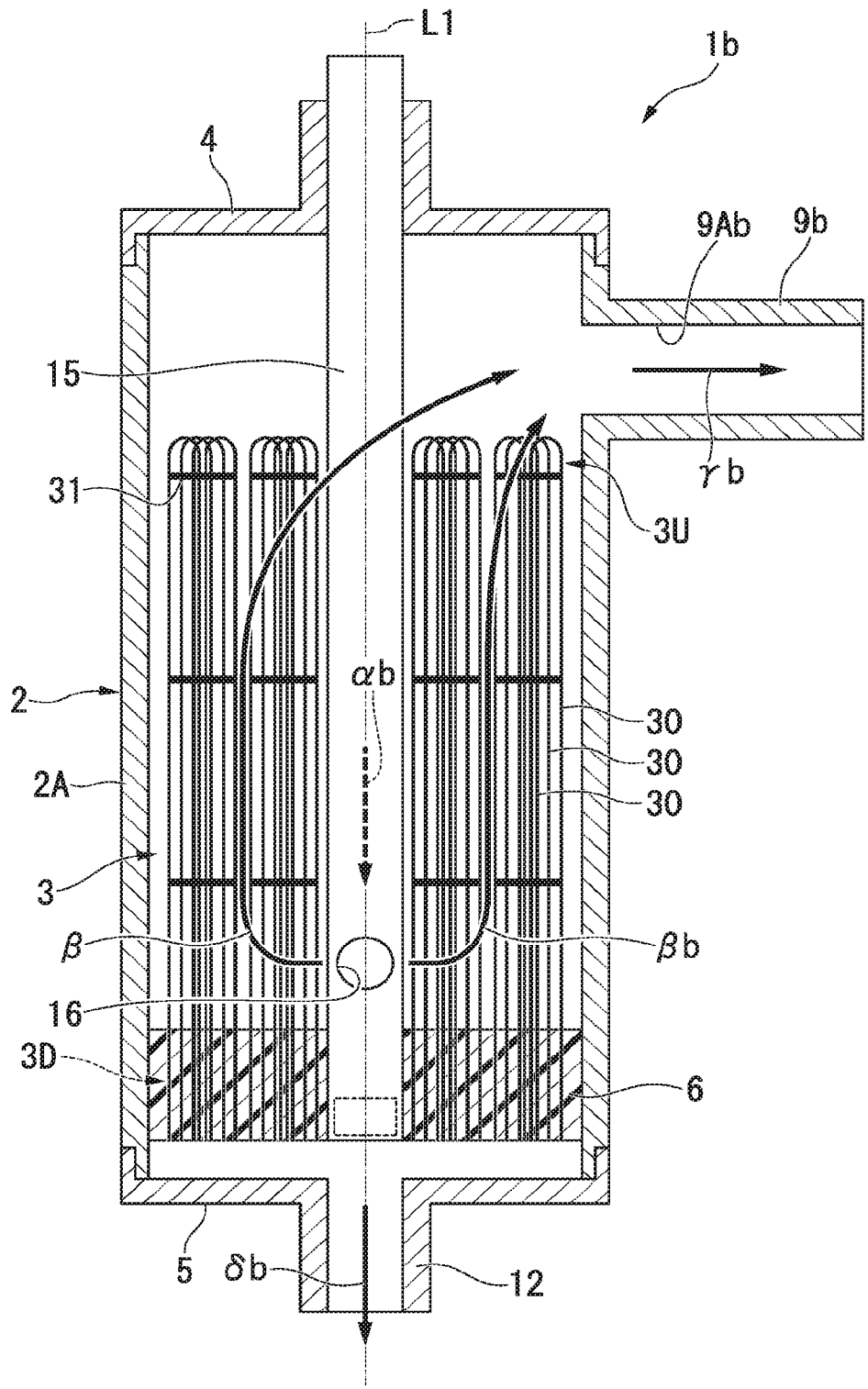
FIG. 12 is a diagram for describing a flow of liquid in the degassing module according to the sixth embodiment of the invention.

In addition, the degassing module 1b of this embodiment is provided with a pipe member 15 that extends in the central axis L1 through the center of the casing 2. The hollow-fiber membrane bundle 3 is provided to avoid the pipe member 15 and is not provided on the central axis L1. The hollow-fiber membrane bundle 3 is extensively provided inside the casing 2 over the circumferential direction and the radial direction excluding a region in which the pipe member 15 is disposed. In FIGS. 10 and 12 to be described below, the pipe member 15 is not illustrated by a cross section for convenience of description.

Incidentally, A material of the hollow-fiber membrane 30 includes, for example, a resin containing one or more kinds of polyolefin (polyethylene, polypropylene, poly (4-methylpentene-1), or the like), fluorine-based resin (polytetrafluoroethylene, polyvinylidene fluoride, ethylene-tetrafluoroethylene copolymer, or the like), polystyrene-based resin, polysulfone-based resin, polyether ketone, polyether ether ketone, polycarbonate, cellulose derivatives, polyamide, polyester, and polymethacrylate, polyacrylate. In addition, the material may include copolymers of these resins or those obtained by introducing a substituent into a part. The polyolefin is preferred from the viewpoint of chemical resistance or consideration for environment load, and the polyethylene or the polypropylene are particularly preferred from the viewpoint of handling during a potting process or a low level of elution into a use solution.

In this embodiment, the pipe member 15 is held in a posture of extending upward from a lower end thereof fitted into the potting portion 6 and extending straightly on the central axis L1 in a state where an upper end thereof is fitted into a tubular portion 4A in the first cover member 4. The upper end of the pipe member 15 is opened, and the lower end thereof is liquid-tightly and air-tightly sealed by a plug 15A.

The pipe member 15 is formed with an inlet 16 through which the liquid flows into the casing 2, and the inlet 16 is opened toward a lower end 3D of the hollow-fiber membrane bundle 3 which is fixed to the potting portion 6 in the casing 2. Thus, the pipe member 15 communicates with the inside of the casing 2 through the inlet 16.

The plurality of inlets 16 are formed side by side in the circumferential direction of the outer peripheral surface of the pipe member 15, the inlet 16 being opened to only an outer peripheral surface of the pipe member 15 which is an upper nearest position of the potting portion 6 and being directed to a direction perpendicular to the central axis L1. The shape of the inlet 16 is not particularly limited, but is preferably a circular shape in terms of workability and flow channel forming properties. Although details are not illustrated in the drawings, four inlets 16 are formed at intervals of 90° in the circumferential direction of the outer peripheral surface of the pipe member 15 in this embodiment. That is, four inlets 16 are formed such that a diagonal line connecting the inlets to each other along the center thereof is at right angle. However, the number of inlets 16 to be formed may be other aspects. The pipe member 15 receives the liquid from the upper end to circulate the received liquid in the inside thereof, and thus the liquid can flow into the casing 2 from the inlet 16.

The pipe member has preferably a cylindrical shape.

A length of the pipe member 15 is preferably set according to the length of the casing in an appropriate manner, a diameter thereof is preferably from 0.7 to 2 cm, and a thickness thereof is preferably from 1 to 3 mm. A relation between the diameter of the pipe member 15 and the diameter of the casing 2 is expressed by [the diameter (cm) of the pipe member 15]:[the diameter (cm) of the casing 2], and is preferably from 0.7:2 to 2:60.

With respect to a surface area of the pipe member 15, the opening area of the inlet 16 is preferably from 5 to 35% by area.

Meanwhile, in the casing 2, an outflow port 9b is provided at the upper end 3U side of the hollow-fiber membrane bundle 3, and allows the liquid to pass by communicating with the liquid chamber f provided in the casing 2. The outflow port 9b is formed into a cylindrical shape having an outlet 9Ab through which the liquid contained in the casing 2 flows out, and is formed such that the outlet 9Ab is located above the upper end 3U of the hollow-fiber membrane bundle 3.

That is, in this embodiment, the outlet 9Ab is provided to have a positional relation not overlapping with the height position of the upper end 3U of the hollow-fiber membrane bundle 3 in a direction perpendicular to the extending direction (the direction of the central axis L1) of the hollow-fiber membrane bundle 3 in which the hollow-fiber membrane bundle 3 extends to the inside of the casing 2 from the potting portion 6. That is, the outlet 9Ab is provided to have the positional relation that a line drawn in the extending direction of a wall surface on a lower side (one end side) of the outlet 9Ab is not overlapped with the height position of the upper end 3U of the hollow-fiber membrane bundle 3. The outlet 9Ab is preferably disposed such that the line drawn in the extending direction of the wall surface on the lower side (one end side) of the outlet 9Ab is located at an upper side from the height position of the upper end 3U of the hollow-fiber membrane bundle 3. With this configuration, at the time of use of the hollow-fiber membrane module 1b, the height position of the upper end 3U of the hollow-fiber membrane bundle 3 is located below the surface of the liquid, and thus the degassing of the liquid can be effectively performed.

Furthermore, in this embodiment, a cylindrical vacuum port 12 is formed at the central portion located on the central axis L1 the second cover member 5 to protrude downward along the central axis L1. The vacuum port 12 communicates with the air chamber g and is connected to a pull-in pump (vacuum pump) which is not illustrated in the drawing.

FIG. 12 illustrates the flow of liquid in the degassing module 1b according to this embodiment.

As illustrated in FIG. 12, first, the liquid flows into the liquid chamber f inside the casing 2 from the inlet 16 through the inside of the pipe member 15 as indicated by an arrow αb in the degassing module 1b.

Next, as indicated by an arrow βb, the liquid flowing into the casing 2 flows upward toward the outflow port 9b while flowing in the direction perpendicular to the central axis L1. At this time, since the inlet 16 and the outflow port 9b (outlet 9Ab) are greatly spaced from each other in the extending direction of the hollow-fiber membrane bundle 3, the liquid flows toward the outflow port 9b while extensively coming in contact with the hollow-fiber membrane bundle 3 in the extending direction of the hollow-fiber membrane bundle 3.

Then, the liquid is discharged to the outside through the outlet 9Ab as indicated by an arrow γb.

The liquid flowing into and out the casing 2 is forcedly fed by a pump (not illustrated) and flows into the casing 2. The pump may be disposed at a downstream side of the outflow port 9b to draw the liquid, and may be disposed at an upstream side of the pipe member 15 to push the liquid.

In addition, when the liquid flows into the liquid chamber f, the gas contained in the liquid is introduced into the hollow-fiber membrane 30 from the outer surface of the hollow-fiber membrane 30 exposed to the inside of the liquid chamber f, and the degassing is performed.

The gas is introduced when the inside of the hollow-fiber membrane 30 is evacuated by the above-described vacuum pump. In FIG. 12, an arrow δb indicates a drawing direction of the vacuum pump.

The degassing module 1b of this embodiment described above includes the hollow-fiber membrane bundle 3 made up of the plurality of hollow-fiber membranes 30, the casing 2 housing the hollow-fiber membrane bundle 3, and the pipe member 15 that has the inlet 16 to communicate with the inside of the casing 2 through the inlet 16, the inlet 16 being the opening through which the liquid flows into the casing 2.

Then, only a lower end (one end) 3D of the hollow-fiber membrane bundle 3 is fixed to the inside of the casing 2 by the potting portion 6. The pipe member 15 is disposed in the casing 2 in a state of extending along the extending direction (central axis L1) of the hollow-fiber membrane bundle 3 in which the hollow-fiber membrane bundle 3 extends to the inside of the casing 2 from the potting portion 6 through the center of the casing 2.

Then, the gas contained in the liquid inside the casing 2 is introduced into the hollow-fiber membrane 30 from the outer surface of the hollow-fiber membrane 30, and thus the degassing is performed.

In such a degassing module 1b, since the hollow-fiber membrane bundle 3 is fixed to the inside of the casing 2 only at the lower end 3D serving as one end and the upper end 3U serving as the other end is the free end, the liquid easily enters between the hollow-fiber membranes 30, and the degassing can be effectively performed.

In addition, since a flow channel of the liquid can be formed along the direction perpendicular to the extending direction of the hollow-fiber membrane bundle 3 by the inlet 16 which is an opening formed in the pipe member 15, the shape of the hollow-fiber membrane bundle 3 hardly collapses, and degassing can be stably performed. Furthermore, since the flow of the liquid flows over a widespread range of the hollow-fiber membrane bundle 3 from the inlet 16, the degassing can be effectively performed.

Further, since one potting portion 6 exists in the casing 2, it is possible to suppress production costs and achieve miniaturization.

Furthermore, in the degassing module 1b according to this embodiment, the inlet 16 serving as an opening in the pipe member 15 is an inlet through which the liquid flows into the casing 2 and is formed at the lower end 3D which is one end of the hollow-fiber membrane bundle 3 in the casing 2, and the outflow port 9b having the outlet 9Ab through which the liquid contained in the casing 2 flows out is provided at the upper end 3U which is the other end of the hollow-fiber membrane bundle 3 in the casing 2.

With this configuration, the flow channel of the liquid is formed over the other end (upper end 3U) from the one end (lower end 3D) of the hollow-fiber membrane bundle 3, and thus it is possible to perform the degassing using effectively the hollow-fiber membrane bundle 3 over the wide range and to improve the efficiency of the degassing. In addition, since the liquid flows toward a root portion, that is, the lower end 3D of the hollow-fiber membrane bundle 3 and excessive diffusion of the hollow-fiber membrane bundle 3 can be suppressed, the liquid can easily spread throughout the hollow-fiber membrane bundle 3 and the efficiency of the degassing can be improved.

Furthermore, in the degassing module 1b according to this embodiment, the outlet 9Ab of the outflow port 9b is formed at a position not overlapping with the height position of the upper end 3U, which is the other end of the hollow-fiber membrane bundle 3, in the direction perpendicular to the direction of the central axis L1.

With this configuration, in this embodiment, it is possible to perform the degassing using effectively the hollow-fiber membrane bundle 3 over the wide range as much as possible and to improve the efficiency of the degassing.

That is, when the outlet 9Ab of the outflow port 9b is formed at a position overlapping with the height position of the upper end 3U, which is the other end of the hollow-fiber membrane bundle 3, in the direction perpendicular to the direction of the central axis L1 the liquid hardly flows to a position separated away from the outlet 9Ab. Meanwhile, when the outlet 9Ab of the outflow port 9b is formed at a position not overlapping with the height position of the upper end 3U as the other end of the hollow-fiber membrane bundle 3 in the direction of the central axis L1, the liquid easily also flows to the hollow-fiber membrane 30 at a position separated largely away from the outlet 9Ab in the radial direction, and the liquid easily flows over the wide range.

Furthermore, in the degassing module 1b according to this embodiment, the hollow-fiber membrane 30 in the hollow-fiber membrane bundle 3 is folded back in the U-shape, both ends thereof are buried in the potting portion 6, and thus the lower end 3D as one end of the hollow-fiber membrane bundle 3 is fixed to the inside of the casing 2 by the potting portion 6.

With this configuration, since a desired density of the hollow-fiber membrane 30 can be ensured by a small number of hollow-fiber membranes 30 in this embodiment, the production efficiency can be improved. In addition, since the hollow-fiber membrane 30 exhibits the U-shape, and the standing state is easily held, the excessive diffusion of the hollow-fiber membrane bundle 3 can be suppressed, whereby the liquid can easily spread throughout the hollow-fiber membrane bundle 3 and the efficiency of the degassing can be improved.

Furthermore, in the degassing module 1b according to this embodiment, the upper end 3U as the other end of the hollow-fiber membrane bundle 3 has substantially the same height position H1 in the direction of the central axis L1.

With this configuration, in this embodiment, the liquid is difficult to disproportionately flow, and the diffusion of the hollow-fiber membrane bundle 3 can be suppressed, whereby the liquid can easily spread throughout the hollow-fiber membrane bundle 3 and the efficiency of the degassing can be improved.

Furthermore, in the degassing module 1b according to this embodiment, the warp fiber 31 expending in the direction perpendicular to the direction of the central axis L1 is provided at the plural places of the hollow-fiber membrane bundle 3 in the direction of the central axis L1 to connect the plurality of hollow-fiber membranes 30 to each other.

With this configuration, in this embodiment, the standing state of the hollow-fiber membrane bundle 3 is reliably held with ease, and the excessive diffusion of the hollow-fiber membrane bundle 3 can be suitably suppressed. When viscosity of the liquid is high, the large diffusion of the hollow-fiber membrane bundle 3 is easily realized. Accordingly, particularly, this configuration effectively functions when the viscosity of the liquid is high.

The hollow-fiber membrane 30 has gas permeability in which a gas permeates between a hollow portion and the outside.

An outer diameter of the hollow-fiber membrane 30 is preferably 280 µm or less, and more preferably 250 µm or less. More specifically, the outer diameter is preferably in a range of from 250 to 150 µm, and more preferably in a range of from 220 to 180 µm. When the outer diameter of the hollow-fiber membrane 30 is in the above numerical range, it is possible to form effectively flow channels between the hollow-fiber membranes in the casing.

An inner diameter of the hollow-fiber membrane 30 is preferably 100 µm or more, and more preferably 120 µm or more. The inner diameter of the hollow-fiber membrane 30 is preferably 200 µm or less. More specifically, the inner diameter is preferably in a range of from 100 to 200 µm, and more preferably in a range of from 110 to 160 µm. When the inner diameter of the hollow-fiber membrane 30 is in the above numerical range, it is possible to house sufficiently the number of hollow-fiber membranes 30 in the casing 2 and maintain excellent degassing performance and durability.

A film thickness of the hollow-fiber membrane 30 is preferably in a range of from 20 to 70 µm, and more preferably in a range of from 25 to 55 µm.

When the film thickness is equal to or less than the upper limit value of the above range, the hollow-fiber membrane 30 in the casing 2 has superior durability when a pressure of the inside thereof is repeatedly reduced. When the film thickness is equal to or more than the lower limit value of the above range, degassing performance can be excellently maintained.

The film thickness of the hollow-fiber membrane is calculated by the following Equation (1) from the difference between the inner diameter and the outer diameter of the hollow-fiber membrane.

Film thickness of hollow-fiber membrane=(Outer diameter of hollow-fiber hollow−Inner diameter of hollow-fiber membrane)/2 (1)

The inner diameter and the outer diameter of the hollow-fiber membrane are actually measured as follows.

First, a number of hollow-fiber membranes are bundled, and the entire outside thereof is covered with a polyurethane resin and is then cured. Subsequently, the cured bundle is sliced along the radial direction of the hollow-fiber membrane such that the length in the longitudinal direction is several mm, whereby a flaky sample having a thickness of several mm is obtained. Then, a cross-sectional optical image of this sample is projected on a screen with, for example, a magnification of 100 times using projector. The outer diameter and inner diameter of each hollow-fiber membrane are measured in the projected image. The operation of measuring by cutting out the sample in this way is repeated five times or more, and the outer diameter and inner diameter of the hollow-fiber membrane are defined with an average value of all values.

The hollow-fiber membrane 30 is preferably a composite membrane having a homogeneous layer with gas permeability and a porous support layer supporting the homogeneous layer in that strength is superior, a dissolved gas can be effectively removed while leakage of liquid is suppressed, and degassing performance is superior.

A specific layer structure of the composite membrane is preferably a two-layer structure in which a porous support layer is provided on the inside or outside of a homogeneous layer or a three-layer structure in which a porous support layer is provided on the inside and the outside of the homogeneous layer, and the three-layer structure is more preferred in terms of strength and degassing performance.

A materials of the homogeneous layer may includes, for example, a silicone rubber-based resin such as polydimethylsiloxane or a copolymer of silicone and polycarbonate (polycarbonate); a polyolefin-based resin such as a copolymer of ethylene and α-olefin, poly-4-methylpentene-1, low density polyethylene, high density polyethylene, linear low density polyethylene, linear ultra-low density polyethylene, polypropylene, ionomer resin, ethylene-vinyl acetate copolymer, ethylene/(meth)acrylic acid copolymer, ethylene/(meth)methyl acrylate copolymer, or modified polyolefin (for example, unsaturated carboxylic acid such as homopolymer or a copolymer of olefin or maleic acid, fumaric acid, acid anhydride, or reactant of ester, metal salt, or the like); a fluorine-containing resin such as polyvinylidene fluoride or polytetrafluoroethylene; a cellulose-based resin such as ethyl cellulose; a polyphenylene oxide; poly-4-vinylpyridine; or an urethane resin. These resins may be used singly or may be used by blending two or more kinds. In addition, a copolymer of these resins can be also used.

Among them, the material of the homogeneous layer preferably includes the polyolefin-based resin, and more preferably the polyolefin-based resin having a density of from 0.850 to 0.910 g/cm³. The homogeneous layer formed of the polyolefin-based resin having the density within the above range is superior in degassing performance even when a liquid to be treated passes at a high flow rate and has a suitable melting point or softening point in practice.

The density is measured based on JIS K 7112 (which is equal to regulation of ASTM D1505).

The polyolefin-based resin having the density of the above range has a melting point (Tm) which is approximately 40 to 100° C. as measured by a differential scanning calorimeter (DSC).

From the viewpoint of chemical resistance of the hollow-fiber membrane 30, the polyolefin-based resin forming the homogeneous layer is preferably an ethylene/α-olefin copolymer which is obtained by a copolymer of ethylene and α-olefins having 3 to 20 carbon atoms and has molecular weight distribution of 4.0 or less.

The α-olefins having 3 to 20 carbon atoms includes, for example, propylene (3 carbon atoms), isobutylene (4 carbon atoms), 1-butene (4 carbon atoms), 1-pentene (5 carbon atoms), 1-hexene (6 carbon atoms), 4-methyl-1-pentene (6 carbon atoms), or 1-octene (8 carbon atoms). As the α-olefins having 3 to 20 carbon atoms, α-olefins having 4 to 20 carbon atoms are preferred, α-olefins having 6 to 8 carbon atoms are more preferred, and the 1-hexene or the 1-octene is particularly preferred.

The α-olefins having 3 to 20 carbon atoms may be used singly or may be used in combination of two or more kinds.

The molecular weight distribution of the ethylene/α-olefin copolymer is preferably 4.0 or less as described above, more preferably 3.5 or less, and particularly preferably 3.0 or less. In this way, the ethylene/α-olefin copolymer having small molecular weight distribution is obtained by, for example, a method of copolymerizing using a metallocene catalyst. For example, it is obtained by a method of copolymerizing using an insite (single-site) catalyst (developed by Dow Chemical Co.) or a constrained geometry catalyst which is a type of so-called metallocene catalyst.

The molecular weight distribution is a ratio (Mw/Mn) of a mass-average molecular weight (Mw) to a number-average molecular weight (Mn). The mass-average molecular weight (Mw) and the number-average molecular weight (Mn) are determined by gel permeation chromatography (GPC) using polystyrene as a standard sample.

With respect to the ethylene/α-olefin copolymer obtained by the copolymer of the ethylene and the α-olefins having 3 to 20 carbon atoms, the α-olefins having 3 to 20 carbon atoms is preferably copolymerized using 10 mol % or more in total monomer in terms of chemical resistance, and more preferably copolymerized using from 20 to 40 mol %.

A melt flow rate (MFR) of the polyolefin-based resin forming the homogeneous layer is preferably from 0.1 to 5 g/10 min at 190° C., and more preferably from 0.3 to 2 g/10 min. When the MFR is equal to or more than the lower limit value of the above range, the homogeneous layer has superior formability. When the MFR is equal to or less than the upper limit value of the above range, the polyolefin-based resin is suppressed from flowing out toward the porous support layer during production of the hollow-fiber membrane, and thus the homogeneous layer can be formed with a uniform thickness and superior degassing performance.

The MFR is a value measured under a test temperature of 190° C. and a test load of 2.16 kgf (21.18 N) according to E condition of ASTM D1238.

A commercially available product of the ethylene/α-olefin copolymer suitable for the formation of the homogeneous layer may include, for example, "AFFINITY (registered trademark), produced by Dow Chemical Co." in which α-olefin has 8 carbon atoms or "Evolu (registered trademark), produced by Prime Polymer Co., Ltd.) in which α-olefin has 6 carbon atoms.

The polyolefin-based resin forming the homogeneous layer may be added with additives such as an antioxidant, an ultraviolet ray absorbent, a lubricant, an anti blocking agent, a colorant, or a flame retardant as a component other than the resin within the range not detrimental to the object of the invention, if necessary.

A material of the porous support layer may include, for example, a silicone rubber-based resin such as polydimethylsiloxane or a copolymer of silicone and polycarbonate (polycarbonate); a polyolefin-based resin such as poly-4-methylpentene-1, poly-3-methyl butene-1, low density polyethylene, or polypropylene; a fluorine-containing resin such as polyvinylidene fluoride or polytetrafluoroethylene; a cellulose-based resin such as ethyl cellulose; an polyphenylene oxide; poly-4-vinylpyridine; an urethane resin; polystyrene; polyether ether ketone; or polyether ketone. These resins may be used singly or may be used by blending two or more kinds. In addition, a copolymer of these resins can be also used.

A pore size of the porous support layer is preferably in a range of from 0.01 to 1 μm. When the pore size is equal to or less than the upper limit value of the above range, the inside of fine pores (pores through which gas permeates) of the homogeneous layer is made hardly wet, and thus the deterioration of the homogeneous layer due to chemicals contained in the liquid to be treated is reduced. When the pore size is equal to or more than the lower limit value of the above range, gas permeability increases and degassing performance becomes superior. In addition, porosity of the porous support layer is preferably from 30 to 80% by volume. When the porosity is equal to or more than the lower limit value of the above range, gas permeability is improved and degassing performance becomes superior. When the porosity is equal to or less than the upper limit value of the above range, the hollow-fiber membrane 30 is improved in mechanical strength such as pressure resistance.

The thickness of the homogeneous layer and the porous support layer is preferably determined such that the film thickness is within the above range, and the thickness of the homogeneous layer is preferably from 0.3 to 2 μm within the range. The thickness of the porous support layer is preferably from 20 to 70 μm, and more preferably from 25 to 55 μm. The thickness of the porous support layer used herein is a total thickness of a plurality of layers when the porous support layer is made up of the plurality of layers (for example, when the porous support layers are laminated with a total of two layers which are formed one by one on the inside and the outside of the homogeneous layer). When the thickness of the homogeneous layer and the porous support layer is equal to or more than the lower limit value of the above range, the hollow-fiber membrane 30 is improved in pressure resistance, mechanical strength, and the like. Moreover, when the thickness is equal to or less than the upper limit value of the above range, the hollow-fiber membrane 30 is improved in gas permeability and degassing performance becomes superior. In addition, the outer diameter of the hollow-fiber membrane 30 is prevented from being excessively larger, and the number of hollow-fiber membranes 30 can be sufficiently housed in the casing 2.

The thickness of the porous support layer can be actually measured from a projected cross-sectional image of a flaky sample in the same method as the actual measurement method of the inner diameter and the outer diameter of the hollow-fiber membrane described above and is obtained as an average value. That is, as described above, a flaky sample having a thickness of several mm is obtained, a cross-sectional optical image of the sample is projected on a screen with, for example, a magnification of 100 times using projector, and the thickness of the porous support layer of each hollow-fiber membrane is measured in the resulting projected image.

The operation of measuring by cutting out the sample in this way is repeated five times, and the thickness of the porous support layer of the hollow-fiber membrane is defined with an average value of all values.

However, since the thickness of the homogeneous layer is usually very small compared with the thickness of the porous support layer, the actual measurement is difficult in some cases. In this case, the film thickness of the hollow-fiber membrane is considered as the thickness of the porous support layer ("Film thickness of hollow-fiber membrane"="Thickness of porous support layer") as calculated by the above Equation (1).

The combination of the material of the homogeneous layer and the material of the porous support layer is not particularly limited, different kinds of resins may be used in combination, and resins of the same kind may be used in combination.

A composite hollow-fiber membrane having the homogeneous layer and the porous support layer can be produced by, for example, a known method including a multi-layer composite spinning process and a drawing pore formation process.

For example, a concentrical composite nozzle is used in which an inner layer nozzle portion, an intermediate layer nozzle portion, and an outer layer nozzle portion are sequentially formed, a molten resin is supplied to the outer layer nozzle portion and the inner layer nozzle portion to form the porous support layer, and a molten resin is supplied to the intermediate layer nozzle portion to form the homogeneous layer. Then, each molten resin is extruded from the concentrical composite nozzle and cooled to solidify, whereby an undrawn hollow fiber is obtained (multi-layer composite spinning process). Next, the undrawn hollow fiber is drawn, and a number of pores are formed on the inner layer and the outer layer (drawing pore formation process). Thus, a hollow-fiber membrane of a three-layer structure is obtained which includes the homogeneous layer and the porous support layers located on the inside and the outside of the homogeneous layer to support the homogeneous layer.

It is preferable that fracture strength of the above hollow-fiber membrane is 0.5 N/fil or more and fracture elongation thereof is 50% or more because of handling properties in a producing process of the hollow-fiber membrane module. It is preferable that the fracture strength is from 0.8 to 3 N/fil and the fracture elongation is from 70 to 400% or more, and it is more preferable that the fracture strength is from 1 to 2.5 N/fil and the fracture elongation is from 140 to 300% or more.

Here, the "fracture strength" means a fracture value of the hollow-fiber membrane when the hollow-fiber membrane is elongated by a load applied in the longitudinal direction.

The "fracture elongation" means an elongation before fracture of the hollow-fiber membrane when the hollow-fiber membrane is elongated by a load applied in the longitudinal direction.

The fracture strength and the fracture elongation of the hollow-fiber membrane can be measured by the following method.

(Fracture Strength and Fracture Elongation of Hollow-Fiber Membrane)

A tensile load is applied in a state where a hollow-fiber membrane with a test length of 2 cm is chucked with a chuck portion of a Tensilon type tensile tester (for example, UCT-1T made by Orientech Co.), fracture elongation with variation in load is measured until the hollow-fiber membrane is fractured. This measurement is performed three times, and an average value of the loads causing the fracture of the hollow-fiber membrane is calculated.

In the cross section of the casing 2, a filling rate of the hollow-fiber membrane bundle 3 is preferably from 20 to 50%, and more preferably from 30 to 45%. When the filling rate of the hollow-fiber membranes equal to or more than the lower limit value, the size of the degassing module 1 becomes easily smaller and occurrence of the drift of liquid is easily suppressed in the degassing module 1. When the filling rate of the hollow-fiber membrane is equal to or less than the upper limit value, filling of the hollow-fiber membrane is facilitated, and it is possible to increase performance by filling more membranes in helping to ensure a proper flow channel.

The filling rate of the hollow-fiber membrane 30 in the cross-sectional casing 2 represents a total ratio (%) of cross-sectional areas of the filled hollow-fiber membrane to a cross-sectional area of the inside of the casing 2 when the degassing module 1 is cut in a direction perpendicular to the axial direction of the hollow-fiber membrane bundle 3. An internal space of the hollow-fiber membrane is not considered as a surface area of the hollow-fiber membrane.

When the casing 2 has the cylindrical shape, the size thereof is preferably from 20 to 60 cm in diameter and preferably from 60 to 250 cm in length.

Seventh Embodiment

Figure 13:
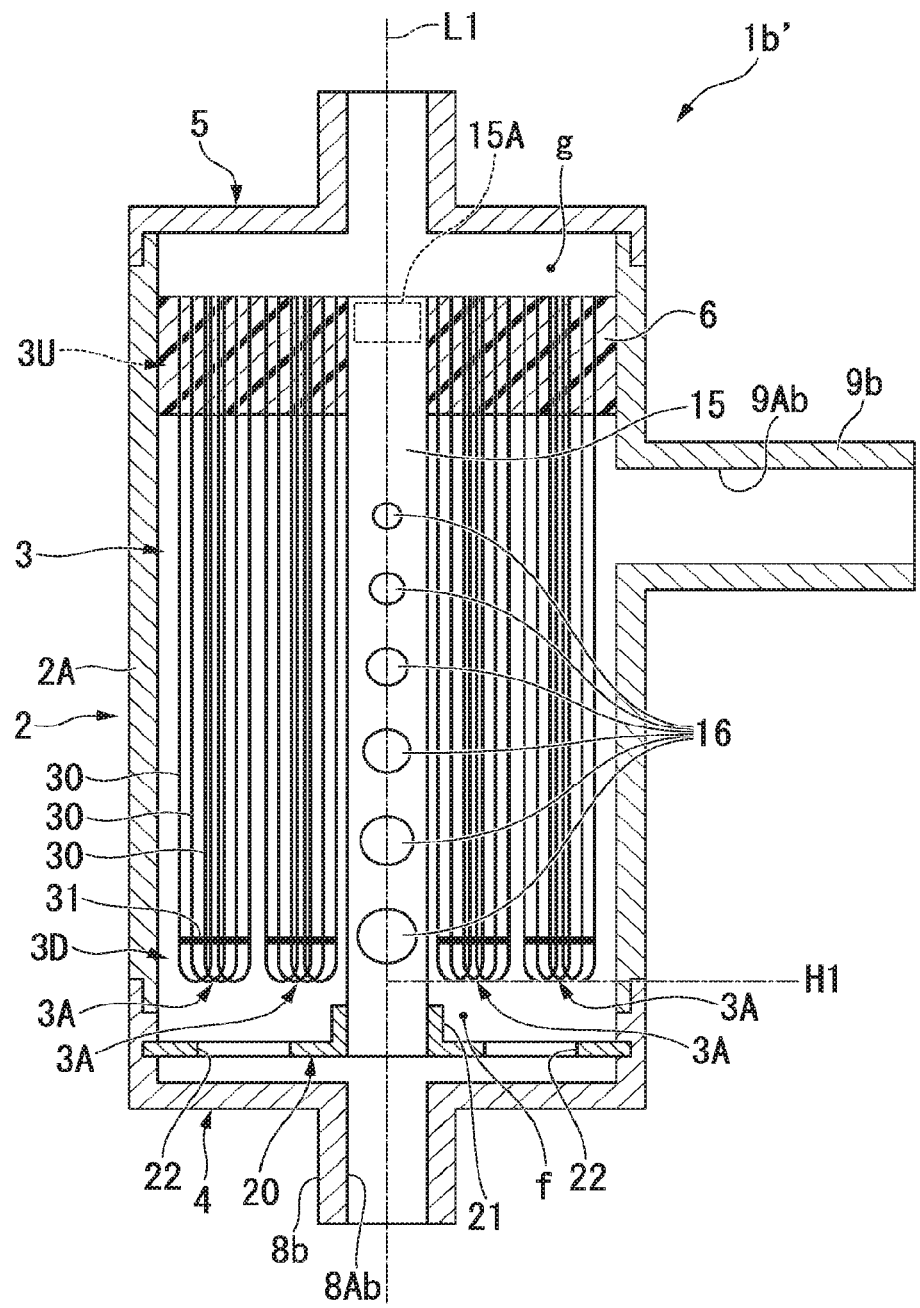
FIG. 13 is a cross-sectional view of a degassing module according to a seventh embodiment of the invention.

Next, a degassing module 1b' according to a seventh embodiment of the invention will be described with reference to FIGS. 13 to 15. In the seventh embodiment, the same components as in the sixth embodiment denote the same numeral references, and the description thereof will not be presented.

The degassing module 1b' includes a casing 2 and a hollow-fiber membrane bundle 3 housed in the casing 2. The casing 2 includes a cylindrical casing body 2A, and a first cover member 4 and a second cover member 5 for covering both end openings of the casing body 2A. The casing 2 is formed to have substantially a columnar appearance by coupling of the casing body 2A, the first cover member 4, and the second cover member 5.

In this embodiment, the first cover member 4 is disposed at a lower side, and the second cover member 5 is disposed at an upper side.

The hollow-fiber membrane bundle 3 is fixed to the inside of the casing 2 by the potting portion 6 only at an upper end 3U, and extends downward along the central axis L1 from the potting portion 6. As in the first embodiment, the hollow-fiber membrane bundle 3 includes a plurality of small bundles 3A, and Each of the small bundles 3A is configured such that one warp fiber 31 extending in a direction perpendicular to the central axis L1 is provided only at a lower side portion thereof and the plurality of hollow-fiber membranes 30 are bundled by the warp fiber 31.

The warp fiber 31 may be configured to connect the plurality of small bundles 3A to each other, and a plurality of warp fibers 31 may be provided at proper places of the small bundle 3A.

Furthermore, even in this embodiment, a lower end 3D of the hollow-fiber membrane bundle 3 has substantially the same height position H1 in an extending direction of the hollow-fiber membrane bundle 3 which is the direction of the central axis L1.

In this embodiment, a pipe member 15 extends downward along the central axis L1 from an upper end thereof fitted into the potting portion 6, and a lower end thereof is disposed in a liquid chamber f inside the casing 2.

In this embodiment, the lower end of the pipe member 15 is opened, and the upper end thereof is liquid-tightly and air-tightly sealed by a plug 15A. Then, the pipe member 15 is formed with a plurality of inlets 16 through which a liquid flows into the casing 2. Thus, the pipe member 15 communicates with the inside of the casing 2 through the inlets 16.

In this embodiment, the lower end of the pipe member 15 is located below the lower end 3D of the hollow-fiber membrane bundle 3, and the lower end of the pipe member 15 is fitted into an inner peripheral surface of a boss portion 21 formed at the central portion of a disk-shaped liquid introduction portion 20 to prevent leakage of the liquid. In addition, the liquid introduction portion 20 is configured such that an outer peripheral portion thereof is fitted into an inner peripheral surface (inner surface of the first cover member 4 in this example) of the casing 2 to prevent leakage of the liquid, thereby compacting the liquid chamber f into two upper and lower chambers.

In this embodiment, a cylindrical inflow port 8b is formed in the first cover member 4 to protrude downward along the direction of the central axis L1, and the inflow port 8b receives a liquid from the outside, the inflow port 8b being formed with an inflow receiving port 8Ab through which the liquid flows into the casing 2. Then, the liquid flowing from the inflow port 8b is first fed to the lower chamber out of the liquid chamber f of the liquid introduction portion 20.

Here, the liquid introduction portion 20 is held by the boss portion 21 in a state where the lower end of the pipe member 15 is opened to the liquid chamber f disposed at the lower side, and thus supplies some of liquid into the pipe member 15. Then, the liquid flows into the upper chamber out of the liquid chamber f of the liquid introduction portion 20 from the inlets 16 of the pipe member 15.

In this embodiment, the plurality of inlets 16 are formed side by side on the outer peripheral surface of the pipe member 15 at predetermined intervals in the axial direction and the circumferential direction, and are formed in the outer peripheral surface of the pipe member 15. In addition, the inlets 16 are formed to have a smaller opening area at the upper end 3U side of the hollow-fiber membrane bundle 3 fixed to the potting portion 6 compared to the opening area at the lower end 3D side.

Although details are not illustrated in the drawings, four inlets 16 are formed at intervals of 90° in the circumferential direction of the pipe member 15 at predetermined positions on the outer peripheral surface in the axial direction of the pipe member 15 in this embodiment, but may be other aspects.

Figure 14:
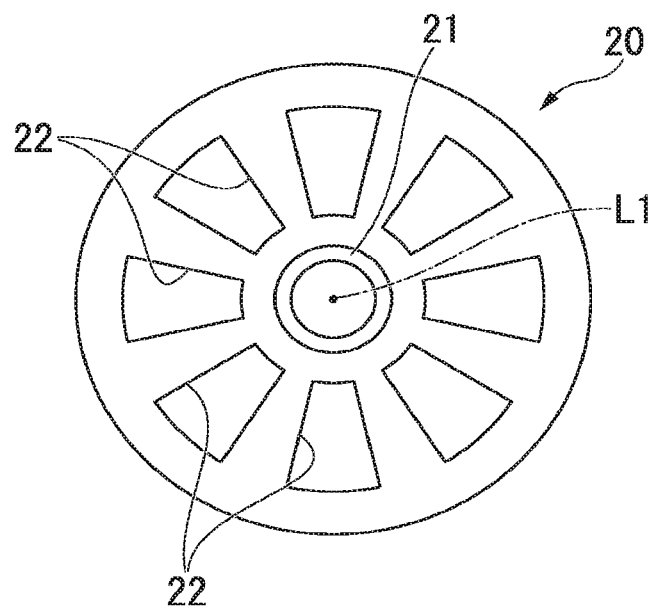
FIG. 14 is a diagram illustrating a liquid introduction portion provided in the degassing module according to the seventh embodiment of the invention.

Furthermore, with reference to FIG. 14 in this embodiment, a plurality of liquid passage ports 22 are formed in the liquid introduction portion 20 to allow the liquid to flow along the extending direction of the hollow-fiber membrane bundle 3 at the outside of the pipe member 15. The plurality of liquid passage ports 22 are formed side by side in the circumferential direction of the pipe member 15 (liquid introduction portion 20) when viewed in the axial direction of the pipe member 15, that is, the direction of the central axis L1. In this embodiment, the liquid passage ports 22 are arranged at intervals of 45° in the circumferential direction, but may be other aspects. The "intervals of 45° in the circumferential direction" means that the liquid passage ports 22 is formed such that a line connecting the center of the liquid passage port 22 and the center of the liquid introduction portion 20 to each other forms an angle of 45°. With respect to a surface area of the liquid introduction portion 20 when viewed in the axial direction of the pipe member 15, the opening area of the liquid passage port 22 is preferably from 20 to 70% by area. The shape of the liquid passage port 22 is not particularly limited, but may be preferably a wedge shape or a modified shape thereof to effectively dispose in a circular shape.

In the casing 2, an outflow port 9b is provided at the upper end 3U side of the hollow-fiber membrane bundle 3 to allow the liquid to pass by communicating with the liquid chamber f in the casing 2. The outflow port 9b is formed in a cylindrical shape to have an outlet 9Ab through which the liquid contained in the casing 2 flows out.

Furthermore, in this embodiment, a cylindrical vacuum port 12 is formed at the central portion located on the central axis L1 in the second cover member 5 to protrude upward along the central axis L1.

Figure 15:
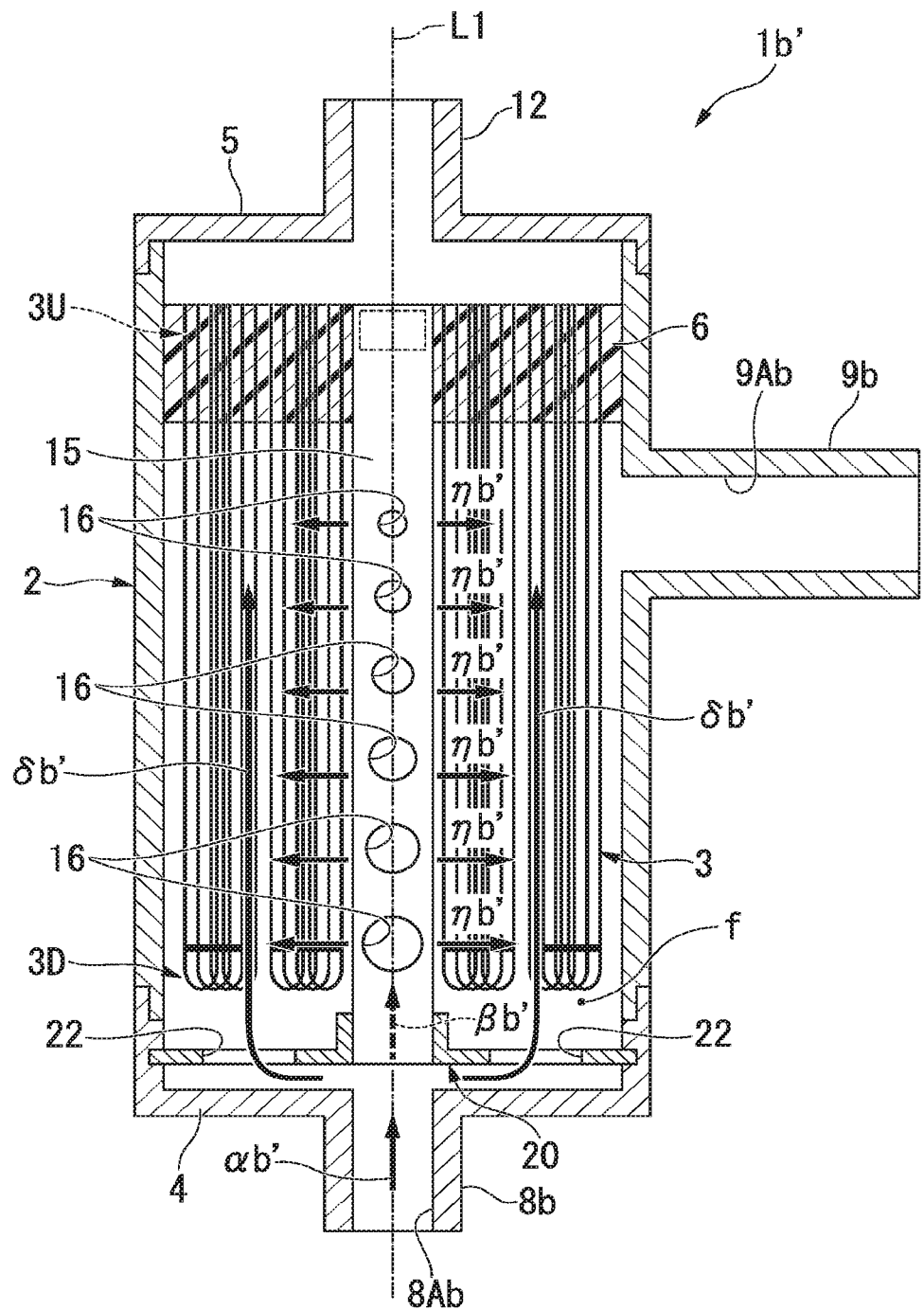
FIG. 15 is a diagram for describing a flow of liquid in the degassing module according to the seventh embodiment of the invention.

FIG. 15 illustrates a flow of liquid in the degassing module 1b' according to this embodiment.

As illustrated in FIG. 15, first, the liquid flows into the upper chamber out of the liquid chamber f of the liquid introduction portion 20 through the inflow port 8b as indicated by an arrow αb' in the degassing module 1b'.

Next, as indicated by arrows βb' and δb', the liquid flows into the pipe member 15 and flows toward the liquid passage port 22 of the liquid introduction portion 20. Then, the liquid flows along the extending direction of the hollow-fiber membrane bundle 3 from the liquid passage port 22 as indicated by the arrow δb'. At this time, since the liquid passage port 22 and the outflow port 9b (outlet 9Ab) are greatly separated from each other in the extending direction of the hollow-fiber membrane bundle 3, the liquid flows toward the outflow port 9b while extensively coming in contact with the hollow-fiber membrane bundle 3 in the extending direction of the hollow-fiber membrane bundle 3.

In addition, as indicated by an arrow ηb', the liquid also flows in the direction perpendicular to the extending direction (central axis L1) of the hollow-fiber membrane bundle 3 from the inlet 16. Thus, the liquid flowing along the extending direction of the hollow-fiber membrane bundle 3 from the liquid passage port 22 is agitated, and thus the liquid effectively comes in contact with the hollow-fiber membrane bundle 3.

Even in the degassing module 1b' according to this embodiment described above, the same effect as that of the sixth embodiment is obtained.

Furthermore, in the degassing module 1b' according to this embodiment, the openings formed in the pipe member 15 is the inlets 16 of the liquid, and the liquid introduction portion 20 is provided at the lower end 3D side (specifically, the first cover member 4) serving as the other end of the hollow-fiber membrane bundle 3 in the casing 2 to allow the liquid to flow therethrough along the hollow-fiber membrane bundle 3 at the outside of the pipe member 15. Then, the outflow port 9b having the outlet 9Ab, through which liquid contained in the casing 2 flows out, is provided at the upper end 3U side which is one end of the hollow-fiber membrane bundle 3 in the casing 2.

With this configuration, in this embodiment, the flow channel of the liquid is formed over one end (upper end 3U) from the other end (lower end 3D) of the hollow-fiber membrane bundle 3 in this embodiment, and the flow channel of the liquid is formed by the pipe member 15 along the direction perpendicular to the extending direction of the hollow-fiber membrane bundle 3, whereby it is possible to perform the degassing using effectively the hollow-fiber membrane bundle 3 over the wide range as much as possible and to improve the efficiency of the degassing.

Furthermore, in the degassing module 1b' according to this embodiment, the plurality of inlets 16 are formed in the pipe member 15 to be opened at the outer peripheral surface of the pipe member 15, and the inlets 16 formed in the axial direction of the pipe member 15 are formed to have a smaller opening area at the upper end 3U side, which is one end of the of the hollow-fiber membrane bundle 3, compared to the opening area at the lower end 3D side which is the other end thereof.

With this configuration, it is possible to perform the degassing using effectively the hollow-fiber membrane bundle 3 over the wide range as much as possible and to improve the efficiency of the degassing.

Furthermore, in degassing module 1b' according to this embodiment, since the liquid introduction portion 20 includes the plurality of liquid passage ports 22 that are arranged in the circumferential direction of the pipe member 15 when viewed in the axial direction of the pipe member 15, it is possible to perform the degassing using effectively the hollow-fiber membrane bundle 3 over the wide range as much as possible and to improve the efficiency of the degassing.

Furthermore, in the degassing module 1b' according to this embodiment, since the plurality of inlets 16 are formed side by side on the outer peripheral surface of the pipe member 15 at predetermined intervals in the axial direction and the circumferential direction, it is possible to perform the degassing using effectively the hollow-fiber membrane bundle 3 over the wide range as much as possible and to improve the efficiency of the degassing.

The sixth and seventh embodiments of the invention are described above, but the invention is not limited to the above embodiments and many various modifications can be added to the invention without departing from the spirit of the invention.

For example, although each of the casing body 2A, the first cover member 4, and the second cover member 5 of the casing 2 are described as a separate example in the sixth and seventh embodiments, these components may be integrated.

For example, in the case of the sixth embodiment, the casing body 2A and the first cover member 4 are integrally configured, and only the second cover member 5 may be separately configured.

Furthermore, although the configuration where the lower end of the pipe member 15 is fitted into the potting portion 6 is described in the above sixth embodiment, the lower end of the pipe member 15 is supported by the casing 2 to be located in the liquid chamber f, the opening as the inlet opened along the central axis L1 may be formed at the lower end or the upper end of the pipe member 15, and the opening may be formed at the outer peripheral surface of the lower end or the upper end thereof.

In addition, although the configuration where the inlet 16 is disposed at the lower side and the outflow port 9b is disposed at the upper side is described in the above sixth embodiment, such upper and lower sides or the like are not particularly limited. For example, the inlet 16 and the outflow port 9*b* may be located at a distance from each other in the horizontal direction, and the hollow-fiber membrane bundle 3 may be configured to extend in the horizontal direction. Furthermore, the inlet 16 may be located at the upper side and the outflow port 9*b* may be located at the lower side. Such a positional relation can be similarly changed even in the seventh embodiment.

Furthermore, in each of the sixth and seventh embodiments, the casing 2 may be the circular cylindrical body in cross section, but the shape is not limited thereto. For example, the casing 2 may be, for example, the rectangular hollow body in cross section.

Furthermore, in the seventh embodiment, the plurality of liquid passage ports 22 are formed in the liquid introduction portion 20 to have a distance from each other over the entire region in the circumferential direction of the liquid introduction portion 20. However, the liquid passage ports 22 may be not formed over the entire region in the circumferential direction of the liquid introduction portion 20.

In addition, although the configuration where the inlets 16 are formed in the pipe member 15 to have a smaller opening area at the upper end 3U side of the hollow-fiber membrane bundle 3 compared to the opening area at the lower end 3D side thereof is described in the seventh embodiment, the inlets 16 may have the same opening area.

Furthermore, in the configuration described in the seventh embodiment where the inlets 16 are formed to have a smaller opening area at the upper end 3U side of the hollow-fiber membrane bundle 3 compared to the opening area at the lower end 3D side thereof, the number of openings formed at the upper end 3U side may be smaller than that of openings formed at the lower end 3D side, each of the openings having the same size.

In addition, the configuration has been described in the sixth embodiment in which the plurality of inlets 16 are formed side by side in the circumferential direction of the outer peripheral surface of the pipe member 15, the inlet 16 being opened to only an outer peripheral surface of the pipe member 15 which is an upper nearest position of the potting portion 6 and being directed to the direction perpendicular to the central axis L1.

Here, in the case of the configuration of the sixth embodiment, as other aspects, it may be configured such that a large quantity of liquid flowing into the casing 2 through the inlet 16 flow from the region opposite to the region, in which the outflow port 9*b* is formed, across the center of the casing 2, than the region in which the outflow port 9*b* is formed.

In this case, the liquid can easily spread throughout the hollow-fiber membrane bundle 3 and the efficiency of the degassing can be improved.

As a specific configuration, for example, an aspect is considered in which the opening area of the inlet opened toward the region opposite to the region, in which the outflow port 9*b* is formed, is larger in the radial direction than that of the inlet 16 opened toward the region in which the outflow port 9*b* is formed.

In the above sixth embodiment, the liquid introduction portion 20 is not configured, but the liquid introduction portion 20 may be provided as in the above seventh embodiment, and the upper end of the pipe member 15 may be opened.

In the above sixth embodiment, the plurality of inlet 16 are not configured, but the plurality of inlet 16 may be provided as in the seventh embodiment. In addition, the inlets 16 may be formed to have a smaller opening area at the upper end 3U side of the hollow-fiber membrane bundle 3 compared to the opening area at the lower end 3D side thereof, and the inlets 16 may have the same opening area.

In addition, although the degassing module using the vacuum pump are described as an example of the hollow-fiber membrane module in each of the embodiment, the invention can be also used as a gas-liquid mixing module which is configured to supply a pressurized gas into the module using a gas supply pump or the like instead of the vacuum pump. Even in this case, the water flows in the same manner as in each of the above embodiments, the same effect of the invention is exhibited that the liquid easily enters between the hollow-fiber membranes, and the efficiency of gas-liquid mixing can be improved.

In addition, although the example where the hollow-fiber membrane bundle 3 is fixed to the inside of the casing 2 only at one end thereof is described in each of the above embodiments, the hollow-fiber membrane bundle 3 may be fixed to the inside of the casing 2 at both ends thereof.

INDUSTRIAL APPLICABILITY

According to the invention, since a hollow-fiber membrane bundle is fixed to the inside of a casing only at one end thereof and the other end thereof is a free end, a liquid easily enters between the hollow-fiber membranes, and degassing or gas-liquid mixing can be effectively performed. In addition, since one potting portion exists in the casing, it is possible to suppress production costs and achieve miniaturization.

In addition, the module is mounted on an inkjet printer, and thus it is possible to provide an inkjet printer that is excellent in production, storage stability, ejection properties, graininess at printing, and the like.

EXPLANATIONS OF LETTERS OR NUMERALS

1: degassing module (hollow-fiber membrane module)
2: casing
2A: casing body
3: hollow-fiber membrane bundle
3A: small bundle
30: hollow-fiber membrane
31: warp fiber
6: potting portion
8: first port
8A: outlet
9: second port
9A: inlet
10: dispersion plate
11: opening
9*b*: outflow port
15: pipe member
16: inlet
20: liquid introduction portion
21: boss portion

The invention claimed is:
1. A external-perfusion hollow-fiber membrane module comprising:
a hollow-fiber membrane bundle including a plurality of hollow-fiber membranes; and
a casing that houses the hollow-fiber membrane bundle, wherein
the hollow-fiber membrane bundle has one end that is fixed to an inside of the casing by a potting portion in an open state, the other end of the hollow-fiber membrane bundle is a free end, and the external-perfusion hollow-fiber membrane module is configured to perform degassing on a gas contained in a liquid inside the casing, the gas being introduced into an inside from an outer surface of the hollow-fiber membrane.

2. The external-perfusion hollow-fiber membrane module according to claim 1, wherein the hollow-fiber membrane is a composite membrane including a homogeneous layer with gas permeability and a porous support layer supporting the homogeneous layer.

3. The external-perfusion hollow-fiber membrane module according to claim 1, wherein the hollow-fiber membrane has an outer diameter of 280 μm or less.

4. The external-perfusion hollow-fiber membrane module according to claim 1, wherein the hollow-fiber membrane has fracture strength of 0.5 N/fil or more and has fracture elongation of 50% or more.

5. The external-perfusion hollow-fiber membrane module according to claim 1, wherein the hollow-fiber membrane bundle has a filling rate of from 20 to 50% in a cross section of the casing.

6. The external-perfusion hollow-fiber membrane module according to claim 1, wherein the hollow-fiber membrane bundle in the casing has one end that is provided with a first port communicating with the inside of the casing to pass a liquid therethrough, and the hollow-fiber membrane bundle in the casing has the other end side that is provided with a second port communicating with the inside of the casing to pass a liquid therethrough.

7. The external-perfusion hollow-fiber membrane module according to claim 6, wherein the first port is an outflow port having an outlet through which the liquid contained in the casing flows out, the outlet being disposed at a position spaced from a center of the casing, the second port is an inflow port having an inlet through which a liquid flows into the casing, and the external-perfusion hollow-fiber membrane module is configured such that a large quantity of liquid flowing into the casing through the inlet of the inflow port flow from a region opposite to a region, in which the outlet is formed, across the center of the casing, than the region in which the outlet is formed.

8. The external-perfusion hollow-fiber membrane module according to claim 7, wherein the inlet is disposed on a straight line extending in an extending direction of the hollow-fiber membrane bundle in which the hollow-fiber membrane bundle extends to the inside of the casing from the potting portion through the center of the casing, the inside of the casing is disposed with a dispersion plate having openings through which the liquid flowing from the inlet passes, and the dispersion plate is formed such that an opening area of the opening formed in the region opposite to the region, in which the outlet is formed, across the center of the casing is larger than an opening area of the opening formed in the region in which the outlet is formed.

9. The external-perfusion hollow-fiber membrane module according to claim 1, further comprising:

a pipe member that communicates with the inside of the casing through an opening through which a liquid flows into the casing or the liquid contained in the casing flows out, wherein the pipe member is installed to extend along an extending direction of the hollow-fiber membrane bundle in which the hollow-fiber membrane bundle extends to the inside of the casing from the potting portion through the center of the casing.

10. The external-perfusion hollow-fiber membrane module according to claim 9, wherein the opening in the pipe member is formed on an outer peripheral surface of the pipe member.

11. The external-perfusion hollow-fiber membrane module according to claim 9, wherein the opening in the pipe member is an inlet through which a liquid flows into the casing, and is opened toward one end of the hollow-fiber membrane bundle in the casing, and the hollow-fiber membrane bundle in the casing has the other end side at which an outflow port is provided, the outflow port having an outlet through which a liquid contained in the casing flows out.

12. The external-perfusion hollow-fiber membrane module according to claim 11, wherein the outlet of the outflow port is formed at a position not overlapping with a height position of the other end of the hollow-fiber membrane bundle in a direction perpendicular to an extending direction of the hollow-fiber membrane bundle in which the hollow-fiber membrane bundle extends to the inside of the casing from the potting portion.

13. The external-perfusion hollow-fiber membrane module according to claim 9, wherein the opening in the pipe member is an inlet through which a liquid flows into the casing, the hollow-fiber membrane bundle in the casing has the other end side that is provided with a liquid introduction portion through which a liquid flows in along the hollow-fiber membrane bundle at an outside of the pipe member, and the hollow-fiber membrane bundle in the casing has one end side that is provided with an outflow port having an outlet through which the liquid contained in the casing flows out.

14. The external-perfusion hollow-fiber membrane module according to claim 13, wherein the opening in the pipe member is formed on an outer peripheral surface of the pipe member, and a plurality of openings are formed in an axial direction of the pipe member, and the openings are formed to have a smaller opening area at the one end side of the hollow-fiber membrane bundle compared to the opening area at the other end side thereof.

15. The external-perfusion hollow-fiber membrane module according to claim 14, wherein the plurality of openings in the pipe member are formed side by side at predetermined intervals in the axial direction and the circumferential direction on the outer peripheral surface of the pipe member, and are formed on the outer peripheral surface of the pipe member.

16. The external-perfusion hollow-fiber membrane module according to claim 13, wherein the liquid introduction portion includes a plurality of liquid passage ports arranged in a circumferential direction of the pipe member when viewed in the axial direction of the pipe member.

17. The external-perfusion hollow-fiber membrane module according to claim 1, wherein the hollow-fiber membrane is folded back in a U-shape in the hollow-fiber membrane bundle, and both ends thereof are buried in the potting portion, whereby the one end of the hollow-fiber membrane bundle is fixed to the inside of the casing by the potting portion.

18. The external-perfusion hollow-fiber membrane module according to claim 1, wherein the other end of the hollow-fiber membrane bundle has substantially the same height position in an extending direction of the hollow-fiber membrane bundle in which the hollow-fiber membrane bundle extends to the inside of the casing from the potting portion.

19. The external-perfusion hollow-fiber membrane module according to claim 1, wherein the hollow-fiber membrane bundle has at least one place, which is provided with a warp fiber extending in a direction perpendicular to an extending direction to connect the plurality of the hollow-fiber membranes to each other, in the extending direction of the hollow-fiber membrane bundle in which the hollow-fiber membrane bundle extends to the inside of the casing from the potting portion.

20. The external-perfusion hollow-fiber membrane module according to claim 1, wherein the casing has a cylindrical shape.

21. An inkjet printer comprising the hollow-fiber membrane module according to claim 20.

* * * * *

UNITED STATES PATENT AND TRADEMARK OFFICE
CERTIFICATE OF CORRECTION

PATENT NO. : 9,821,251 B2
APPLICATION NO. : 14/906726
DATED : November 21, 2017
INVENTOR(S) : Yoshie Tanizaki et al.

Page 1 of 1

It is certified that error appears in the above-identified patent and that said Letters Patent is hereby corrected as shown below:

On the Title Page

Item (54) and in the Specification, Column 1, Lines 1-3, should read:
--EXTERNAL-PERFUSION HOLLOW-FIBER MEMBRANE MODULE AND INKJET PRINTER HAVING SAID MODULE--

Signed and Sealed this
Twenty-eighth Day of May, 2019

Andrei Iancu
*Director of the United States Patent and Trademark Office*